(12) United States Patent
Cho et al.

(10) Patent No.: US 10,001,667 B2
(45) Date of Patent: Jun. 19, 2018

(54) DISPLAY AND DISPLAY APPARATUS USING THE SAME

(71) Applicant: SAMSUNG ELECTRONICS CO., LTD., Suwon-si (KR)

(72) Inventors: Jinhyun Cho, Seoul (KR); Jonghee Han, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 80 days.

(21) Appl. No.: 15/142,014

(22) Filed: Apr. 29, 2016

(65) Prior Publication Data

US 2016/0320665 A1    Nov. 3, 2016

(30) Foreign Application Priority Data

Apr. 29, 2015    (KR) .......................... 10-2015-0060736

(51) Int. Cl.
*G02F 1/1335*    (2006.01)
*G02F 2/02*    (2006.01)

(52) U.S. Cl.
CPC .. *G02F 1/133528* (2013.01); *G02F 1/133504* (2013.01); *G02F 1/133514* (2013.01); *G02F 1/133536* (2013.01); *G02F 1/133555* (2013.01); *G02F 1/133617* (2013.01); *G02F 2/02* (2013.01); *G02F 2001/133507* (2013.01);
(Continued)

(58) Field of Classification Search
CPC ......... G02F 2001/133507; G02F 2001/133614
See application file for complete search history.

(56) References Cited

U.S. PATENT DOCUMENTS

| 7,982,812 B2 | 7/2011 | Rho et al. |
| 2007/0285598 A1 | 12/2007 | Hwang et al. |
| 2010/0079704 A1 | 4/2010 | Cho et al. |

(Continued)

FOREIGN PATENT DOCUMENTS

| EP | 2 746 843 A1 | 6/2014 |
| KR | 10-2014-0113144 A | 9/2014 |

(Continued)

OTHER PUBLICATIONS

Communication dated Jul. 19, 2016, issued by the European Patent Office in counterpart European Application No. 16166881.9.
(Continued)

*Primary Examiner* — Kendrick Hsu
(74) *Attorney, Agent, or Firm* — Sughrue Mion, PLLC

(57) ABSTRACT

Disclosed is a display apparatus a display of which includes a liquid crystal panel; a light source configured to emit light toward the liquid crystal panel; a first polarization layer disposed on a first surface of the liquid crystal panel and configured to transmit a first polarized component of the light emitted from the light source; a second polarization layer disposed on a second surface of the liquid crystal panel opposed to the first surface and configured to transmit a second polarized component of light emitted from the liquid crystal panel; and a color filter disposed on a surface of the second polarization layer from which the second polarized component exits, the color filter comprising a quantum dot layer configured to filter light having preset colors out of the second polarized component exiting the second polarization layer.

12 Claims, 25 Drawing Sheets

(52) U.S. Cl.
CPC ............ *G02F 2001/133548* (2013.01); *G02F 2001/133614* (2013.01); *G02F 2202/36* (2013.01)

(56) References Cited

U.S. PATENT DOCUMENTS

| | | |
|---|---|---|
| 2012/0050632 A1 | 3/2012 | Shih |
| 2012/0154464 A1 | 6/2012 | Ninan et al. |
| 2013/0242228 A1 | 9/2013 | Park et al. |
| 2014/0132890 A1 | 5/2014 | Zhang |
| 2016/0033822 A1* | 2/2016 | Jiang .................. G02F 1/13338 349/33 |

FOREIGN PATENT DOCUMENTS

| | | |
|---|---|---|
| KR | 10-1495764 B1 | 2/2015 |
| KR | 10-1496928 B1 | 3/2015 |

OTHER PUBLICATIONS

International Search Report (PCT/ISA/210) dated Jul. 26, 2016 issued by the International Searching Authority in counterpart International Application No. PCT/KR2016/004366.

\* cited by examiner

DISPLAY AND DISPLAY APPARATUS USING THE SAME

CROSS-REFERENCE TO RELATED APPLICATIONS

This application claims priority from Korean Patent Application No. 10-2015-0060736, filed on Apr. 29, 2015 in the Korean Intellectual Property Office, the disclosure of which is incorporated herein by reference.

BACKGROUND

Field

Apparatuses and methods consistent with the exemplary embodiments described herein relate to a display and a display apparatus using the same, which uses a backlight unit to provide light to a display panel having a non-emissive structure so as to display an image, and more particularly to a display and a display apparatus using the same, in which an optical loss caused by optical components inside the display apparatus is minimized while light emitted from the backlight unit finally exits from the display panel to the outside, thereby improving optical efficiency.

Related Art

A display apparatus is an apparatus that includes a display panel for displaying an image based on a broadcast signal or an image signal/image data of various formats, and is achieved by a television (TV), a monitor, etc. The display panel may be one of various types of display panels such as a liquid crystal panel, a plasma panel, etc. in accordance with its characteristics and may be applied to various display apparatuses.

The display panel provided in the display apparatus may have a light receiving panel structure and a self-emissive panel structure. The light receiving panel structure is a non-emissive structure in which the display panel cannot emit light by itself, and thus needs a separate backlight unit to emit and provide light to the display panel. For example, a liquid crystal display (LCD) panel has such a light receiving panel structure. On the other hand, the self-emissive panel structure does not need a separate backlight unit since it can emit light by itself. For example, an organic light emitting diode (OLED) panel has such a self-emissive panel structure.

In a display apparatus having the light receiving panel structure, light emitted from a light source passes through many components such as a light guide plate, optical sheets, etc. before reaching the display panel, and subsequently passes through a polarization layer, a liquid crystal layer, etc. after passing through the display panel. Thus, the light is diffused, scattered, polarized and so as to adjust the optical properties of the light. However, some optical losses are caused in this process. Ultimately, the amount of light exiting from the display panel is remarkably less than the amount of light emitted from the light source. Therefore, the display apparatus may need to minimize such optical losses.

SUMMARY

According to an aspect of an exemplary embodiment, a display apparatus is provided including: a signal processor configured to process an image signal; and a display configured to display an image based on the image signal processed by the signal processor, the display comprising: a liquid crystal panel; a light source configured to emit light toward the liquid crystal panel; a first polarization layer disposed on a first surface of the liquid crystal panel and configured to transmit a first polarized component of the light emitted from the light source; a second polarization layer disposed on a second surface of the liquid crystal panel opposed to the first surface and configured to transmit a second polarized component of light emitted from the liquid crystal panel; and a color filter disposed on a surface of the second polarization layer from which the second polarized component exits, the color filter comprising a quantum dot layer configured to filter light having preset colors out of the second polarized component exiting the second polarization layer. Since the light is filtered for polarization through the polarization layer and then converted by the quantum dots to have the preset colors, it is possible to reduce optical losses which may be caused by polarization filtering even though the light emitted from the light source becomes unpolarized due to collision with the quantum dots, thereby improving the optical efficiency of the display apparatus.

The display apparatus may further comprise a light compensation layer interposed in between the second polarization layer and the color filter, the light compensation layer may be configured to reflect a preset polarized component of light traveling from the color filter toward the second polarization layer toward the color filter. The light compensation layer may comprise a dual brightness enhancement film (DBEF). Thus, if the light exiting the quantum dots travels in an opposite direction to the light emitted from the light source, this light is at least partially reflected to thereby improve the optical efficiency.

The light compensation layer may comprise a diffusion layer formed on a surface thereof facing the second polarization layer, and the diffusion layer may diffuse light passed through the light compensation layer and traveling toward the second polarization layer. As a result, the light passed through the light compensation layer and traveling in an opposite direction to the light emitted from the light source may be diffused so as to be recycled again.

The display apparatus may further comprise a light compensation layer interposed in between the second polarization layer and the color filter, the light compensation layer may be configured to transmit the second polarized component exiting the second polarization layer and to reflect a polarized component different from the second polarized component. As a result, it is possible to improve the optical efficiency of the light emitted from the light source.

The light source may emit blue light, and the quantum dot layer may comprise a red filter area for filtering red light out of the blue light, and a green filter area for filtering green light out of the blue light. As a result, it is possible to generate red light and green light while minimizing optical losses in the blue light emitted from the light source.

The color filter may comprise a light transmission area comprising a transparent material for transmitting the blue light; and the red filter area, the green filter area, and the light transmission area may be arranged corresponding to red, green, and blue (RGB) sub pixels of the liquid crystal panel, respectively. As a result, it is possible to improve an efficiency of generating light having the RGB colors in the display apparatus.

The second polarization layer may comprise a linear grid, the linear grid may comprise a plurality of bars defining a plurality of slits extending in a common direction, the linear grid may be configured to reflect the second polarized component of the light entering the second polarization layer. Thus, if the light exiting the quantum dots travels in a direction opposite to the light emitted from the light source even though a separate light compensation layer is not interposed in between the color filter and the second polarization layer, this light may be partially reflected from the second polarization layer, thereby improving the optical efficiency.

The display apparatus may further comprise a prism sheet arranged in between the light source and the first polarization layer, the prism sheet configured to focus the light emitted from the light source. Thus, the light emitted from the light source may evenly enter the areas respectively corresponding to the colors of the color filter, so that the RGB colors can have normal proportions.

According to an aspect of an exemplary embodiment, a display is provided comprising: a liquid crystal panel; a first polarization layer disposed on a first surface of the liquid crystal panel and configured to transmit a first polarized component of the light emitted from the light source; a second polarization layer disposed on a second surface of the liquid crystal panel opposed to the first surface and configured to transmit a second polarized component of light emitted from the liquid crystal panel; and a color filter disposed on a surface of the second polarization layer from which the second polarized component exits, the color filter comprising a quantum dot layer configured to filter light having preset colors out of the second polarized component exiting the second polarization layer. Since the light is filtered for polarization through the polarization layer and then converted by the quantum dots to have the preset colors, it is possible to reduce optical losses which may be caused by the polarization filtering even though the light emitted from the light source becomes unpolarized due to collision with the quantum dots, thereby improving the optical efficiency of the display apparatus.

The display may further comprise a light compensation layer interposed in between the second polarization layer and the color filter, the light compensation layer may be configured to reflect a preset polarized component of light traveling from the color filter toward the second polarization layer toward the color filter. The light compensation layer may comprise a DBEF. As a result, if the light exiting the quantum dots travels in a direction opposite to the light emitted from the light source, this light may be reflected to thereby improve the optical efficiency.

The light compensation layer may comprise a diffusion layer formed on a surface thereof facing the second polarization layer, and the diffusion layer may diffuse light passed through the light compensation layer and traveling toward the second polarization layer. Thus, the light passed through the light compensation layer and traveling in a direction opposite to the light emitted from the light source may be diffused so as to be recycled again.

The light source may emit blue light, and the quantum dot layer may comprise a red filter area for filtering red light out of the blue light, and a green filter area for filtering green light out of the blue light. Thus, it is possible to generate red light and green light while minimizing optical losses in the blue light emitted from the light source.

The color filter may comprise a light transmission area comprising a transparent material for transmitting the blue light; and the red filter area, the green filter area, and the light transmission area may be arranged corresponding to RGB sub pixels of the liquid crystal panel, respectively. Thus, it is possible to improve an efficiency of generating the light having the RGB colors in the display apparatus.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings. The following descriptions of the exemplary embodiments are made by referring to elements shown in the accompanying drawings, in which like numerals refer to like elements having substantively the same functions.

In the description of the exemplary embodiments, an ordinal number used in terms such as a first element, a second element, etc. is employed for describing a variety of elements, and the terms are used for distinguishing between one element and another element. Therefore, the meanings of the elements are not limited by the terms, and the terms are also used just for explaining the corresponding exemplary embodiment without limiting the scope of the present disclosure.

Further, the exemplary embodiments will describe only those elements directly related to the present disclosure, and description of other elements will be omitted. However, it will be appreciated that the elements, the descriptions of which are omitted, are not unnecessary to realize the apparatus or system according to the exemplary embodiments described herein. In the following descriptions, terms such as "include" or "have" refer to the presence of features, numbers, steps, operations, elements or combinations thereof, and do not exclude the presence or addition of one or more other features, numbers, steps, operations, elements or combinations thereof.

Figure 1:
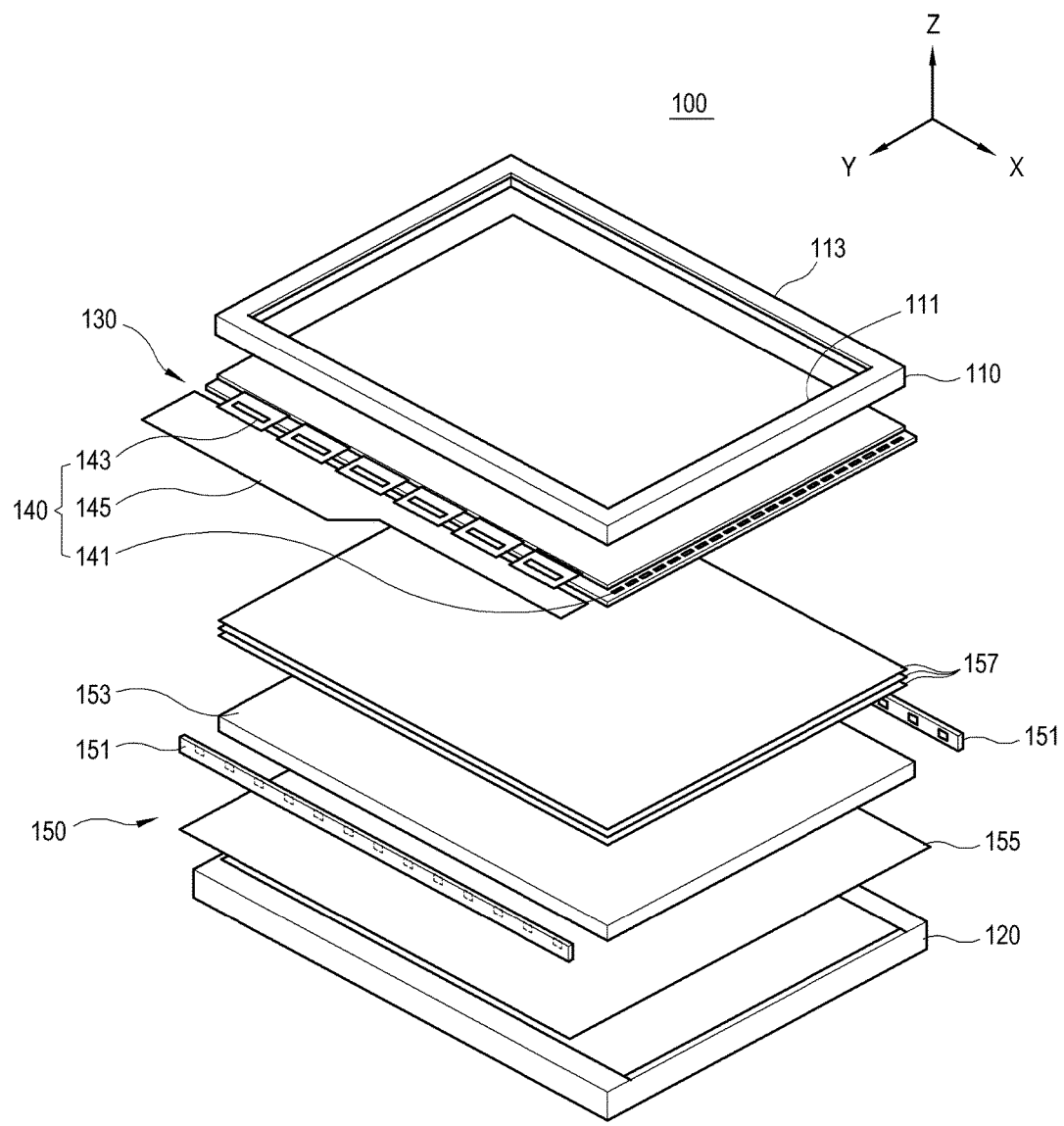
FIG. 1 is an exploded perspective view of a display apparatus according to an exemplary embodiment.

FIG. 1 is an exploded perspective view of a display apparatus 100 according to an exemplary embodiment. In this exemplary embodiment, a display panel 130 cannot emit light by itself. For example, the display panel 130 of the display apparatus 100 may have a liquid crystal structure.

The display apparatus 100 processes an image signal received from the exterior and displays the processed image in itself. The display apparatus 100 may be achieved by a TV, but not limited thereto. Alternatively, the display apparatus 100 may be achieved by various apparatuses such as a monitor, a portable multimedia player, a mobile phone, etc. as long as it includes the display panel 130 for displaying an image.

The display apparatus 100 includes cover frames 110 and 120 forming an accommodating space inside the display apparatus 100, the display panel 130 accommodated within the accommodating space formed by the cover frames 110 and 120 for displaying an image, a panel driver 140 for driving the display panel 130, and a backlight unit 150 arranged in back of the display panel 130 within the accommodating space formed by the cover frames 110 and 120 for providing light to the display panel 130.

First, directions shown in FIG. 1 are defined as follows. X, Y, Z directions respectively indicate horizontal, vertical and normal directions of the display panel 130. In FIG. 1, the display panel 130 is arranged in parallel with an X-Y plane formed by an axis of the X direction and an axis of the Y direction, and the cover frames 110 and 120, the display panel 130 and the backlight unit 150 are stacked along an axis of the Z direction. In addition, opposite directions to the X, Y and Z directions are respectively represented as −X, −Y and −Z.

Unless otherwise stated, "top/above" refers to the Z direction, and "bottom/below" refers to the −Z direction. For example, the backlight unit 150 is arranged below the display panel 130, and light emitted from the backlight unit 150 enters a bottom surface of the display panel 130 and exits a top surface of the display panel 130.

The cover frames 110 and 120 are provided to form an outer appearance of a rectangular display apparatus 100, and support the display panel 130 and the backlight unit 150 accommodated therein. If the Z direction refers to upward or frontward and the −Z direction refers to downward or backward, the cover frames 110 and 120 include a front cover 110 for supporting the front of the display panel 130, and a rear cover 120 for supporting the back of the backlight unit 150 with respect to the display panel 130 in FIG. 1. The front cover 110 has an opening 111 on a plane parallel with the X-Y plane so that a surface of the display panel 130 for displaying an image can be exposed to the outside. Further, a bezel 113 is formed around the opening 111.

The display panel 130 is a non-emissive element that cannot emit light by itself. In this exemplary embodiment, the display panel 130 has a liquid crystal structure. In the liquid crystal display panel 130, a liquid crystal layer is filled in between two transparent substrates, and molecular orientation of the liquid crystal layer is altered by a driving signal to thereby display an image. Since the display panel 130 is a non-emissive element, the display panel 130 has to receive light from the backlight unit 150 in order to display an image. In this exemplary embodiment, the light enters the bottom surface of the display panel 130 and exits the top surface of the display panel 130.

The panel driver 140 inputs a driving signal for driving the liquid crystal layer of the display panel 130. The panel driver 140 includes a gate driving integrated circuit (IC) 141, a data chip film package 143, and a printed circuit board 145.

The gate driving IC 141 is mounted on a substrate of the display panel 130, and is connected to each gate line of the display panel 130.

The data chip film package 143 is connected to each data line of the display panel 130. The data chip film package 143 may include a tape automated bonding (TAB) tape where a semiconductor chip is adhered to a wiring pattern formed on a base film by TAB technique. For example, the data chip film package 143 may use a tape carrier package (TCP), a chip on film (COF) or the like.

The printed circuit board 145 inputs a gate driving signal to the gate driving IC 141, and a data driving signal to the data chip film package 143.

The panel driver 140 inputs the driving signals to each gate line and each data line of the display panel 130 and thus drives the liquid crystal layer of the display panel 130 in units of pixels.

The backlight unit 150 is arranged in the −Z direction of the display panel 130 so as to provide light to the bottom surface of the display panel 130. The backlight unit 150 includes a light source 151, a light guide plate 153 arranged in parallel with the display panel 130 and facing the bottom surface of the display panel 130, a reflection plate 155 arranged in between the light guide plate 153 and the rear cover 120 and facing a bottom surface of the light guide plate 153, and one or more optical sheets 157 interposed in between the display panel 130 and the light guide plate 153.

The light source 151 converts voltage supplied thereto into light and emits the light toward the display panel 130. In this exemplary embodiment, the light source 151 is arranged along the edge of the light guide plate 153, and therefore a light emitting direction of the light source 151 is perpendicular to a light exiting direction of the light guide plate 153. The backlight unit 150 having this structure will be referred to as an "edge type backlight unit." In some exemplary embodiments, the light emitting direction of the light source 151 is parallel to the light exiting direction of the light guide plate 153. The backlight unit 150 having this structure will be referred to as a "direct type backlight unit." In other words, if the light exiting direction of the light guide plate 153 is oriented in the Z direction, the light emitting direction of the light source 151 having the edge type structure is oriented in the Y direction or the −Y direction and the light emitting direction of the light source 151 having the direct type structure is oriented in the Z direction.

The light source 151 is achieved in such a manner that a plurality of light emitting devices arranged in a row is mounted onto the substrate extending in a certain direction. On the substrate, a wiring line is printed for supplying a voltage to the light emitting devices. The light emitting devices may be achieved variously. For example, the light emitting devices in this exemplary embodiment may be light emitting diodes (LEDs).

The light guide plate 153 is a plastic lens made by molding acrylic material and uniformly guides the light from the light source 151 to the entire surface of the display panel 130 for displaying an image. The bottom surface of the light guide plate 153 faces the reflection plate 155, and the lateral edges of the light guide plate 153 between the top surface and the bottom surface face the light source 151. In the case of the edge type backlight unit 150, the light emitted from the light source 151 enters the lateral edges of the light guide plate 153.

The light guide plate 153 has an optical pattern on the bottom surface thereof so that the light propagating within the light guide plate 153 can be irregularly reflected or be changed in a traveling direction. The light is irregularly reflected from the optical pattern and travels in the Z direction, so that the light from the light source 151 can exit the top surface of the light guide plate 153 as uniformly as possible.

The reflection plate 155 is arranged below the light guide plate 153, and returns the light exiting the bottom surface of the light guide plate 153 to the light guide plate 153. Specifically, the reflection plate 155 reflects light, which is reflected from the optical pattern of the light guide plate 153 in the −Z direction, again toward the Z direction so that the light can enter the light guide plate 153 again. To this end, total reflection occurs on the top surface of the reflection plate 155.

One or more optical sheets 155 are stacked on the top surface of the light guide plate 153, and adjust the optical properties of the light exiting from the top surface of the light guide plate 153 toward the display panel 130. The optical sheets 155 may include a diffusion sheet, a prism sheet, a dual brightness enhancement film (DBEF), a protection sheet, etc. and two or more sheets of the optical sheets 155 may be combined to achieve desired optical properties.

Figure 2:
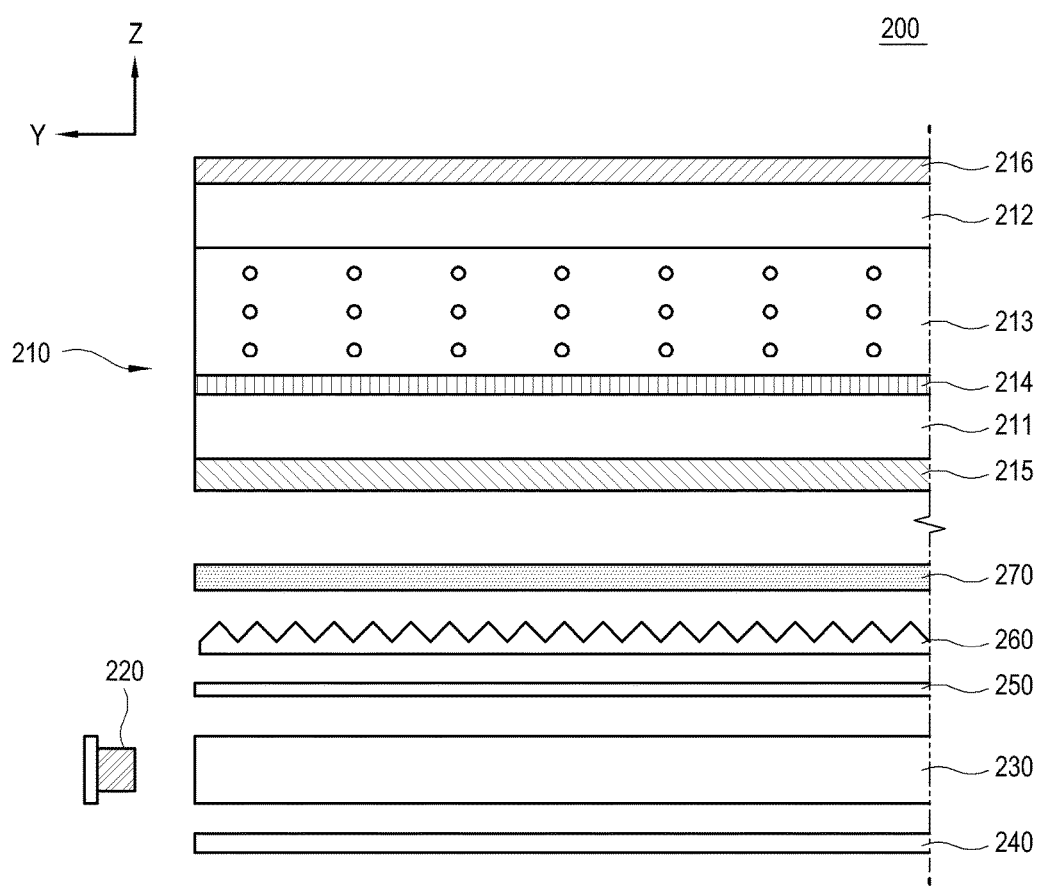
FIG. 2 is a partial cross-section view schematically showing a display apparatus according to a related art with respect to the exemplary embodiment in FIG. 1.

FIG. 2 is a partial cross-section view schematically showing a display apparatus 200 according to a related art with respect to the exemplary embodiment in FIG. 1.

As shown in FIG. 2, the display apparatus 200 includes a display panel 210, a light source 220, a light guide plate 230, a reflection plate 240, and optical sheets 250, 260 and 270. Basically, these elements of the display apparatus 200 are substantially the same as those described with reference to the display apparatus 100.

The display panel 210 includes a lower substrate 211, an upper substrate 212 arranged to face the lower substrate 211, a liquid crystal layer 213 sandwiched between the lower substrate 211 and the upper substrate 212, a color filter 214 interposed between the liquid crystal layer 213 and the lower substrate 211, a lower polarization layer 215 arranged on the bottom surface of the lower substrate 211, and an upper polarization layer 216 arranged on the top surface of the upper substrate 212.

It should be appreciated that the structure of the display panel 210 represents only one of various structures that the liquid crystal display panel can have. Since various panel structures may be applied to the display panel 210 in accordance with designs, the structure of the display panel 210 is not limited to this exemplary embodiment. Further, this exemplary embodiment schematically shows only representative elements of the display panel 210, and thus the actual structure of the display panel 210 may be more complicated and may additionally include elements not mentioned below. In the following exemplary embodiments, a basic structure of the display panel 210 directly related to the present disclosure will be described, and a detailed description of unrelated structures will be omitted for the sake of brevity.

The optical sheets 250, 260 and 270 are interposed in between the top surface of the light guide plate 230 and the display panel 210, and include one or more among various kinds of sheets. In this exemplary embodiment, the optical sheets 250, 260 and 270 include a diffusion sheet 250, a prism sheet 260 and a DBEF 270 which are stacked in sequence. This exemplary embodiment is for illustrative purposes only, and should not be considered to limit the structure of the optical sheets 250, 260 and 270.

Below, the elements of the display panel 210 will be described in detail.

The lower substrate 211 and the upper substrate 212 are transparent substrates arranged to face each other leaving a predetermined space along the Z direction. In terms of material, the lower substrate 211 and the upper substrate 212 may be made of glass or plastic. In those exemplary embodiments in which the lower substrate 211 and/or the upper substrate 212 are made of plastic, suitable plastics may include polycarbonate (PC), polyimide (PI), polyethersulphone (PES), polyacrylate (PAR), poly-ethylene-naphthelate (PEN), poly-ethylene-terephehalate (PET), etc.

The lower substrate 211 and the upper substrate 212 may be required to have individual properties in accordance with driving methods of the liquid crystal layer 213. For example, if the liquid crystal layer 213 is driven by a passive matrix method, the lower substrate 211 and the upper substrate 212 may be made of soda lime glass. On the other hand, if the liquid crystal layer 213 is driven by an active matrix method, the lower substrate 211 and the upper substrate 212 may be made of alkali free glass and borosilicate glass.

The liquid crystal layer 213 is sandwiched in between the lower substrate 211 and the upper substrate 212, and adjusts light transmission as an array of liquid crystal is altered in accordance with a driving signal. Generally, liquid has no regularity in molecular orientation and array, but liquid crystal is similar to a liquid phase having regularity to some extent. For example, some solids exhibit double refraction or anisotropic properties when heated and/or melted. The liquid crystal has optical properties such as double refraction or color change. Liquid crystal has the regularity of a crystal and the liquid properties of a liquid and is thus called "liquid crystal" since it has properties of both a liquid and a crystal. The optical properties of the liquid crystal may be changed as the molecular arrangement of the liquid crystal is varied in orientation depending on an applied voltage.

The liquid crystal of the liquid crystal layer 213 may be a nematic, cholesteric, smectice and/or ferroelectric liquid crystal, for example, in accordance with molecular arrangement of the liquid crystal.

The color filter 214 filters preset colors out of the incident light, and outputs light having corresponding colors. The color filter 214 includes sub pixel areas respectively corresponding to RGB colors. When white light is incident to the color filter 214, the respective sub pixel areas of the color filter 214 convert the white light into the light having the RGB colors, thereby displaying a color image on the display panel 210. That is, the color image is displayed on the display panel 210 in such a manner that white light emitted from the light source 220 is adjusted in its intensity while passing through the liquid crystal layer 213 and RGB colors of the light passed through the color filter 214 are mixed.

The color filter 214 is achieved by forming RGB patterns corresponding to the RGB colors on a black matrix. The black matrix is positioned in between the RGB patterns and is used for dividing RGB sub pixels and blocking the light, thereby enhancing contrast of an image. The RGB patterns in the color filter 214 are manufactured by coloring a light transmission film with pigments or dyes, and absorb light having colors except the color of the film from the incident light.

The lower polarization layer 215 is formed on the bottom surface of the lower substrate 211, and the upper polarization layer 216 is formed on the top surface of the upper substrate 212. That is, according to this exemplary embodiment, the lower substrate 211, the liquid crystal layer 213 and the upper substrate 212 are interposed in between the lower polarization layer 215 and the upper polarization layer 216. The lower polarization layer 215 and the upper polarization layer 216 are provided in the form of a polarizing film to be attached to the lower substrate 211 and the upper substrate 212.

Fundamentally, the light is an electromagnetic wave, and an oscillation direction of the light is perpendicular to a traveling direction of the light. "Polarization" refers to the light polarized in the oscillation direction, i.e., the light strongly oscillating in a certain direction among the directions perpendicular to the traveling direction. The polarizing film divides the incident light into two polarized components orthogonal to each other, and transmits only one of the two polarized components.

The oscillation direction of the light emitted from the light source 220 has substantially the same probability with regard to all directions. The polarizing film transmits only a component of the incident light, which oscillates in the same direction as a polarizing axis, and blocks the light oscillating in the other directions, thereby providing light which oscillates in a predetermined direction.

Detailed structures of the polarizing films, applied to the lower polarization layer 215 and the upper polarization layer 216 according to an exemplary embodiment, will be described below.

The lower polarization layer 215 transmits only a component of the incident light, which has a preset first polarizing direction, and blocks the other components of the incident light. On the other hand, the upper polarization layer 216 transmits only a component of the incident light, which has a preset second polarizing direction, and blocks the other components of the incident light. In this exemplary embodiment, the first polarizing direction is different from the second polarizing direction, and more particularly, the first polarizing direction is perpendicular to the second polarizing direction. For example, the lower polarization layer 215 is provided to transmit a P-polarized light, while the upper polarization layer 216 is provided to transmit an S-polarized light.

The reason why the polarizing direction of the lower polarization layer 215 and the polarizing direction of the upper polarization layer 216 are perpendicular to each other is because the polarizing direction of the light is rotated 90 degrees by the liquid crystal layer 213 as the light emitted from the light source 220 passes through the liquid crystal layer 213. Thus, if the upper polarization layer 216 were to transmit a light component having the same direction as a first polarizing direction of the lower polarization layer 215, the light of the first polarizing direction, which has passed through the lower polarization layer 215, and which is changed to have a second polarizing direction by passing through the liquid crystal layer 213, could not pass through the upper polarization layer 216. Accordingly, the polarized direction of the light passed through the upper polarization layer 216 has to be perpendicular to the polarized direction of the light passed through the lower polarization layer 215.

Below, a process in which the light emitted from the light source 220 is provided to the display panel 210 will be described.

The light source 220 generates light in accordance with applied voltages and emits the light to the lateral edge of the light guide plate 230. In this exemplary embodiment, the light source 220 generates white light.

The light emitted from the light source 220 enters the light guide plate 230 and exits the top surface of the light guide plate 230 after being scattered by the pattern on the bottom surface of the light guide plate 230 and reflected by the reflection plate 240. The light exiting the top surface of the light guide plate 230 includes components of various angles and traveling directions with respect to the Z direction.

The light exiting the light guide plate 230 is changed in optical properties while passing through the diffusion sheet 250, the prism sheet 260 and the DBEF 270, and then reaches the lower polarization layer 215.

The diffusion sheet 250 is formed by using a polymer sheet as a base and coating both sides thereof with micro-sized small diffusion pigment. Specifically, the diffusion sheet 250 is formed by applying a binder to both sides of the polymer sheet and coating beads on the binder. Since the beads diffuse the light, the diffusion sheet 250 serves to offset the patterns formed on the bottom surface of the light guide plate 230.

The prism sheet 260 focuses the incident light of various directions toward the Z direction. The light passed through the diffusion sheet 250 is diffused in both directions, i.e., horizontal and vertical directions, and thus decreases in brightness. The prism sheet 260 refocuses the light diffused in many directions to thereby increase the brightness again. The prism sheet 260 may be formed by using polyethylene terephthalate (PET) as a base, and extending a plurality of prisms on the top surface of this PET base, from which the light exits, in one direction. The traveling direction of the incident light is varied depending on refraction in these prisms.

The DBEF 270 transmits one polarized-component of the light exiting the light guide plate 230 in the Z direction, and reflects the other polarized components in the −Z direction, thereby recycling the light. For example, the DBEF 270 transmits the P-polarized component of the light exiting the light guide plate 230 but reflects the S-polarized component toward the light guide plate 230. The S-polarized component reflected toward the light guide plate 230 is returned to the DBEF 270 by re-scattering in the pattern on the light guide plate 230 and re-reflection in the reflection plate 240. In this process, the DBEF 270 transits the P-polarized component of the recycled light, but reflects the other components. Therefore, the DBEF 270 has a relatively high optical efficiency of transmitting the light to the lower polarization layer 215.

The polarizing direction of the light passed through the DBEF 270 is the same as that of the lower polarization layer 215. For example, if the lower polarization layer 215 is provided to transmit the P-polarized component, the DBEF 270 is also provided to transmit the P-polarized component. Detailed functions of the DBEF 270 will be described in more detail below.

The lower polarization layer 215 polarizes the light from the DBEF 270 and transmits it to the color filter 214. The color filter 214 filters and converts white light into light having RGB colors respectively corresponding to sub pixels and transmits it to the liquid crystal layer 213. The light passed through the liquid crystal layer 213 having the RGB colors exits to the outside via the upper polarization layer 216. Thus, it is possible to display a color image on the display panel 210.

In the related art, the color filter 214 may include the filter colored with dyes. As a result, the light may be absorbed in the color filter 214 during a color filtering process for the incident light. This in turn may result in low optical efficiency which decreases the brightness of the image. To increase the optical efficiency, the color filter 214 needs to have an improved structure. The improved structure of the color filter 214 for enhancing the optical efficiency will be described in more detail below.

Figure 3:
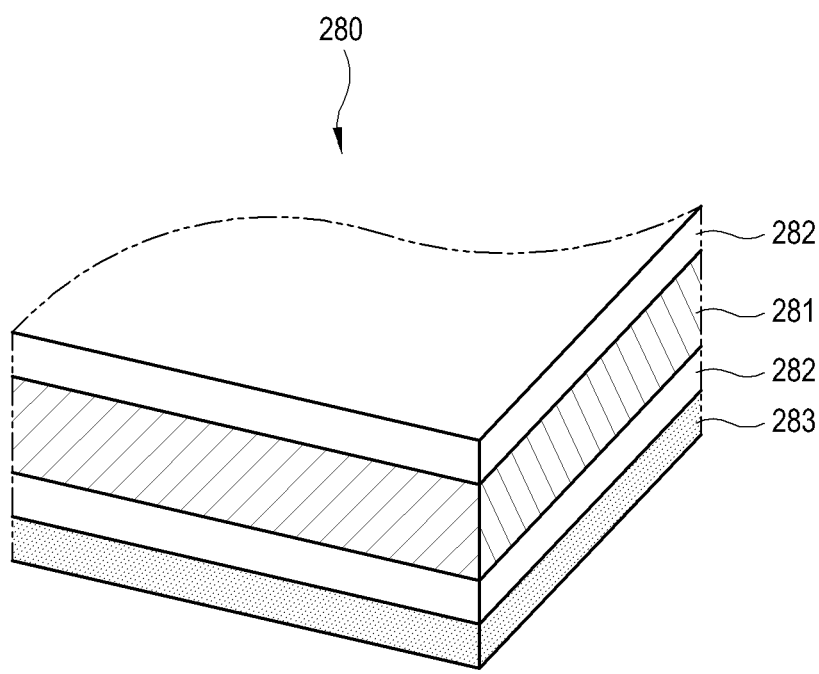
FIG. 3 is a perspective view illustrating a structure of a polarizing film of the display apparatus of FIG. 2.

FIG. 3 illustrates a structure of a polarizing film 280. In FIG. 3, the polarizing film 280 has the same basic structure as the lower polarization layer 215 (see FIG. 2) and the upper polarization layer 216 (see FIG. 2).

As shown in FIG. 3, the polarizing film 280 has a structure in which protection layers 282 made of a tri-acetate cellulose (TAC) film are adhered to both sides of a polarizing element 281 made of a PVA film colored with a dichroic material. This structure is the most fundamental structure of the polarizing film 280 and will be referred to as a three-layer structure of 'TAC-PVA-TAC.' The surface of the TAC film employed as the protection layer 282 may be subject to surface coating processes corresponding to required characteristics such as scattering, hardness enhancement, no reflection, low reflection, etc.

In addition, the polarizing film 280 includes an adhesive layer 283 formed on the protection layer 282 such that the polarizing film 280 may be attached to the lower substrate 211 (see FIG. 2) or the upper substrate 212 (see FIG. 2).

The polarizing film 280 may be manufactured by stretching a poly vinyl alcohol (PVA) film along a certain axis in order to orient polymer chains in the stretching direction, coloring the stretched PVA film with dichroic iodine molecules or dichroic dye molecules, and orienting the colored film in the stretching direction. Since dichroic iodine molecules and dye molecules are oriented parallel to the stretching direction, light oscillating in the stretching direction will be transmitted.

Figure 4:
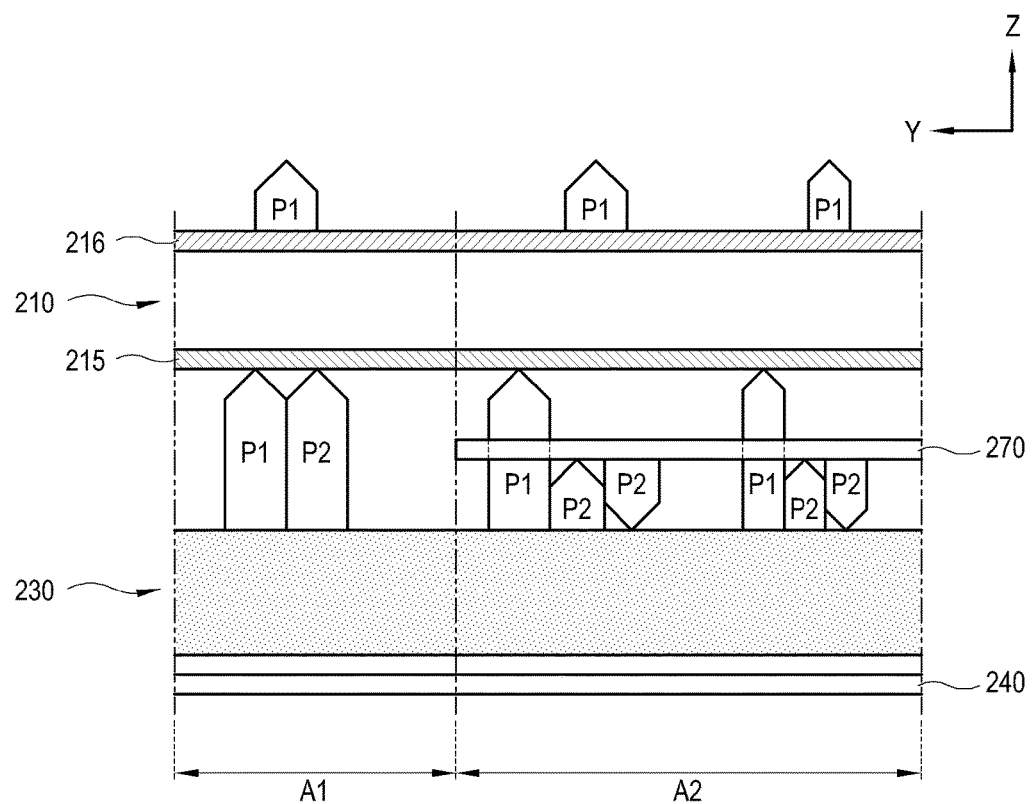
FIG. 4 is a schematic view illustrating differences in an optical efficiency of a display apparatus according to the presence and absence of a dual brightness enhancement film (DBEF)

FIG. 4 schematically illustrates differences in an optical efficiency of the display apparatus in accordance with the presence and absence of the dual brightness enhancement film (DBEF) 270.

As shown in FIG. 4, an area A1 where the DBEF 270 is not present and an area A2 where the DBEF 270 is present are set up to determine the performance of the DBEF 270. The area A1 and the area A2 have the same structure except for the presence of the DBEF 270. The light exiting the light guide plate 230 includes the polarized component P1 and the polarized component P2. The polarizing direction of the polarized component P1 is perpendicular to the polarizing direction of the polarized component P2.

In the area A1, light having the polarized component P1 and the polarized component P2 is filtered for polarization by the lower polarization layer 215. The polarized component P1 passes through the lower polarization layer 215, but the polarized component P2 does not pass through the lower polarization layer 215. Therefore, the light passed through the display panel 210 and ultimately exiting the upper polarization layer 216 in the area A1 has the amount of light corresponding to only the polarized component P1. In this exemplary embodiment, for comparison between the area A1 and the area A2, the amount of light lost inside the display panel 210 will be ignored.

On the other hand, if light having the polarized component P1 and the polarized component P2 reaches the DBEF 270 in the area A2, the component P1 is transmitted to the lower polarization layer 215 through the DBEF 270. The light of the polarized component P1 passes through the lower polarization layer 215 and exits the upper polarization layer 216. These steps are the same as those of the area A1.

The polarized component P2 is reflected in the −Z direction by the DBEF 270. The reflected polarized component P2 enters the light guide plate 230 again, and becomes unpolarized by the optical pattern on the bottom surface of the light guide plate 230. The unpolarized light is reflected by the reflection plate 240 in the Z direction and reaches the DBEF 270. The DBEF 270 transmits the polarized component P1 to the lower polarization layer 215, and reflects the polarized component P2 in the −Z direction. The polarized component P1 transmitted to the lower polarization layer 215 passes through the lower polarization layer 215 and exits the upper polarization layer 216.

As these steps are repeated, the amount of light exiting from the area A2 becomes more than that exiting from the area A1. The presence of the DBEF 270 has an effect on increasing the optical efficiency by about 60% as compared with that in the absence of the DBEF 270, in which the optical efficiency may be varied depending on environments of the apparatus.

The foregoing display apparatus 200 has the edge-type backlight structure, but is not limited thereto. Alternatively, the direct-type backlight structure may be used for the display apparatus 200.

Figure 5:
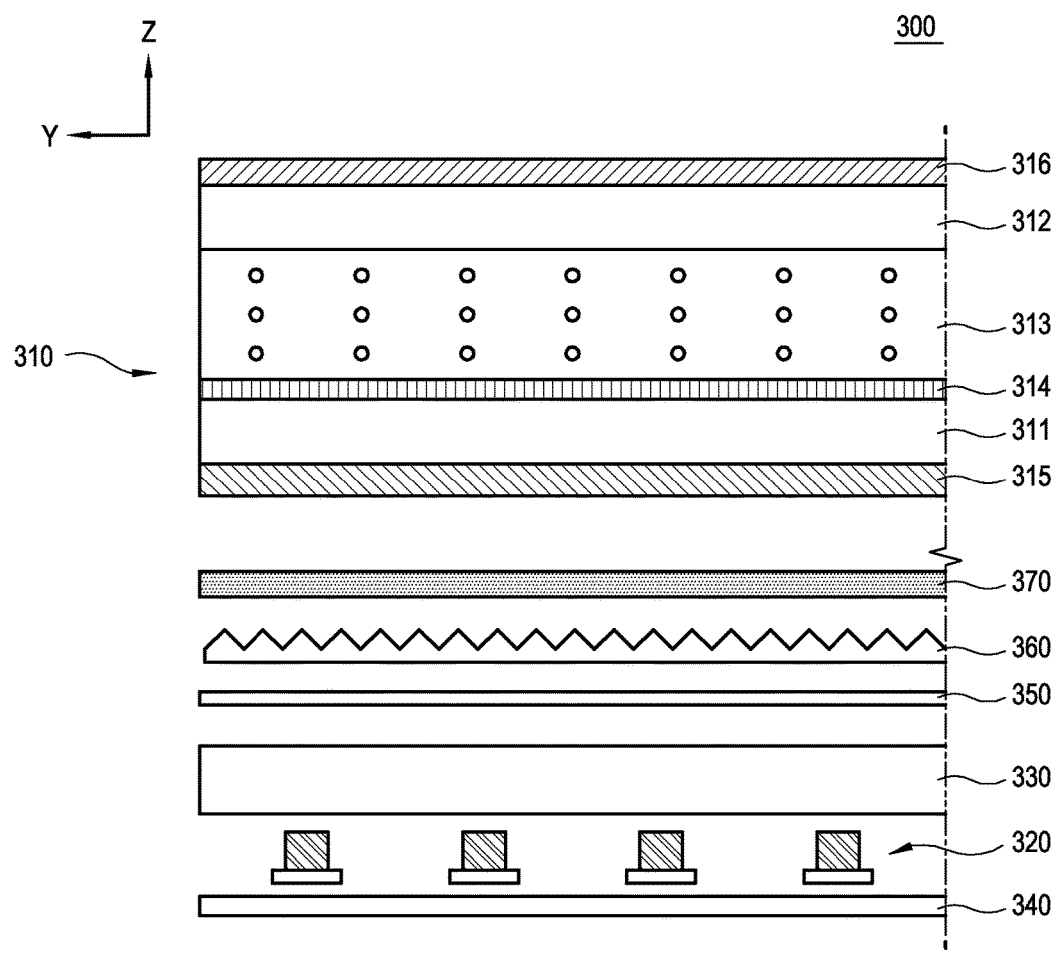
FIG. 5 is a partial cross-section view schematically showing a display apparatus according to a related art with respect to the exemplary embodiment in FIG. 1.

FIG. 5 is a partial cross-section view schematically showing a display apparatus 300 according to a related art with respect to the exemplary embodiment in FIG. 1.

As shown in FIG. 5, the display apparatus 300 includes a display panel 310, a light source 320, a light guide plate 330, a reflection plate 340, a diffusion sheet 350, a prism sheet 360, and a DBEF 370. The display panel 310 includes a lower substrate 311, an upper substrate 312, a liquid crystal layer 313, a color filter 314, a lower polarization layer 315, and an upper polarization layer 316. In general, these elements have substantially the same functions and operations as those described above with reference to the display apparatus 200 (see FIG. 2), and thus repetitive descriptions thereof will be omitted for the sake of brevity.

However, this related art shows the direct-type backlight structure in which the light source 320 is interposed in between the bottom surface of the light guide plate 330 and the reflection plate 340. That is, the light source 220 (see FIG. 2) described above with reference to the display apparatus 200 emits light in the Y/−Y direction so that the light can enter the lateral edges of the light guide plate 230 (see FIG. 2), whereas the light source 320 according to this exemplary embodiment emits light in the Z direction so that the light can enter the bottom surface of the light guide plate 330. The direct-type backlight structure may provide the advantage of making it easier to perform local dimming as compared to the edge-type backlight structure; however, both backlight structures use substantially the same steps to change optical properties.

The color filter 314 according to this related art includes a film colored with dye like that of the color filter 214 (see FIG. 2) described above with reference to the display apparatus 200, and thus absorbs the light, thereby lowering the optical efficiency. The color filter 314 will be described in more detail below with reference to FIG. 6.

Figure 6:
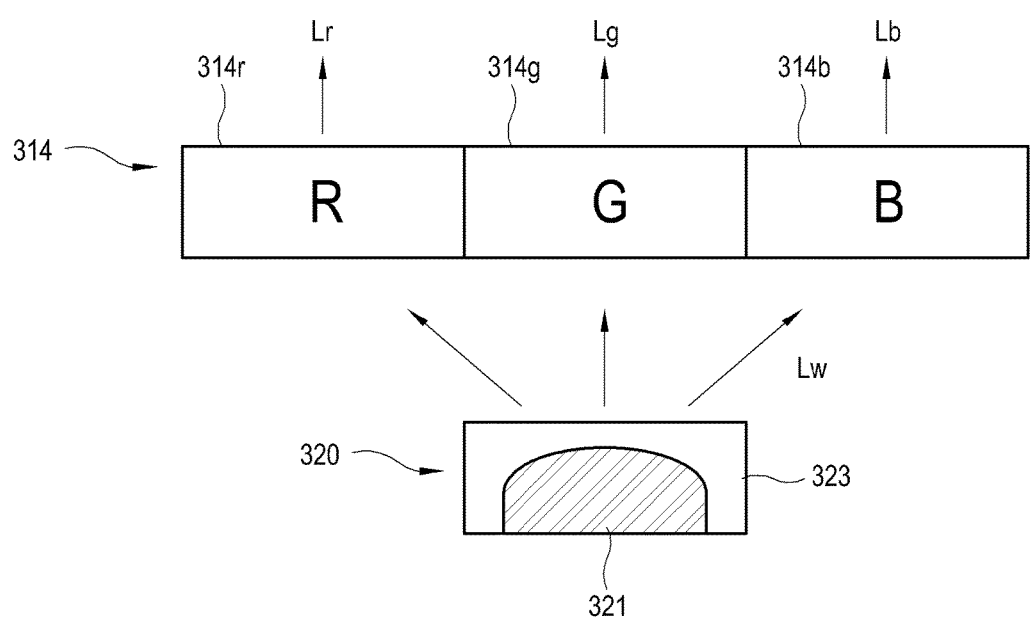
FIG. 6 is a schematic view illustrating a principle that a color filter filters red, green, and blue (RGB) colors out of light from a light source of the display apparatus of FIG. 5.

FIG. 6 schematically illustrates a principle that the color filter 314 filters red, green and blue (RGB) colors out of light from the light source 320.

As shown in FIG. 6, the light source 320 generates and emits white light Lw. To generate the white light, the light source 320 includes a blue light LED 321 which emits blue light, and an RG fluorescent material 323 which surrounds the blue light LED 321 and thereby generates the red light and the green light by colliding with the blue light. The RG fluorescent material 323 includes a phosphor material.

Some photons of the blue light emitted from the blue light LED 321 collide with particles of the RG fluorescent material 323. The collision with the photons causes red light or green light to come out of the corresponding particles, and the other photons of the blue light, which do not collide with the particles of the RG fluorescent material 323, come out as blue light. Therefore, the red light, the green light and the blue light emitted from the RG fluorescent material 323 are mixed to thereby make the light source 320 emit the white light Lw.

A reason why the light source 320 requires such a structure to emit the white light Lw may be explained as follows: Since the wavelength of the blue light is shorter than wavelengths of the red light and the green light, the blue light LED 321 for emitting the blue light has a higher optical efficiency than red light LEDs for the red light or green light LEDs for the green light. That is, the blue light LED 321 can emit more light with respect to a certain voltage than red light LEDs or green light LEDs. Further, according to the second law of thermodynamics, energy flows or moves from high to low, and it is irreversible. Therefore, it is possible to generate the green light or the red light by differences in energy due to collision between the blue light and the phosphor particles, but it is impossible to generate the blue light by collision between the red light or the green light and the phosphor particles.

The white light Lw emitted from the light source 320 enters the respective sub pixel layers 314*r*, 314*g* and 314*b* of the color filter 314. The sub pixel layers 314*r*, 314*g* and 314*b* include a red dye layer 314*r*, a green dye layer 314*g* and a blue dye layer 314*b*, and convert the white light Lw into red light Lr, green light Lg and blue light Lb.

The color filter 314 according to an exemplary embodiment may include a filtering structure based on dye. As a result, an optical loss may occur because the light may be absorbed in the respective sub pixel layers 314*r*, 314*g* and 314*b*. For example, the red dye layer 314*r* transmits the red light Lr, but absorbs the green light Lg and the blue light Lb; the green dye layer 314*g* transmits the green light Lg, but absorbs the red light Lr and the blue light Lb; and the blue dye layer 314*b* transmits the blue light Lb, but absorbs the red light Lr and the green light Lg.

In this manner, the color filter 314 may transmit 33% (⅓) of the white light Lw, but absorb about 66% (⅔) of the white light Lw. Therefore, ⅔ of the total amount of light may be absorbed or lost in the color filter 314, thereby lowering the optical efficiency.

To increase the optical efficiency, a related art will be described in more detail below.

Figure 7:
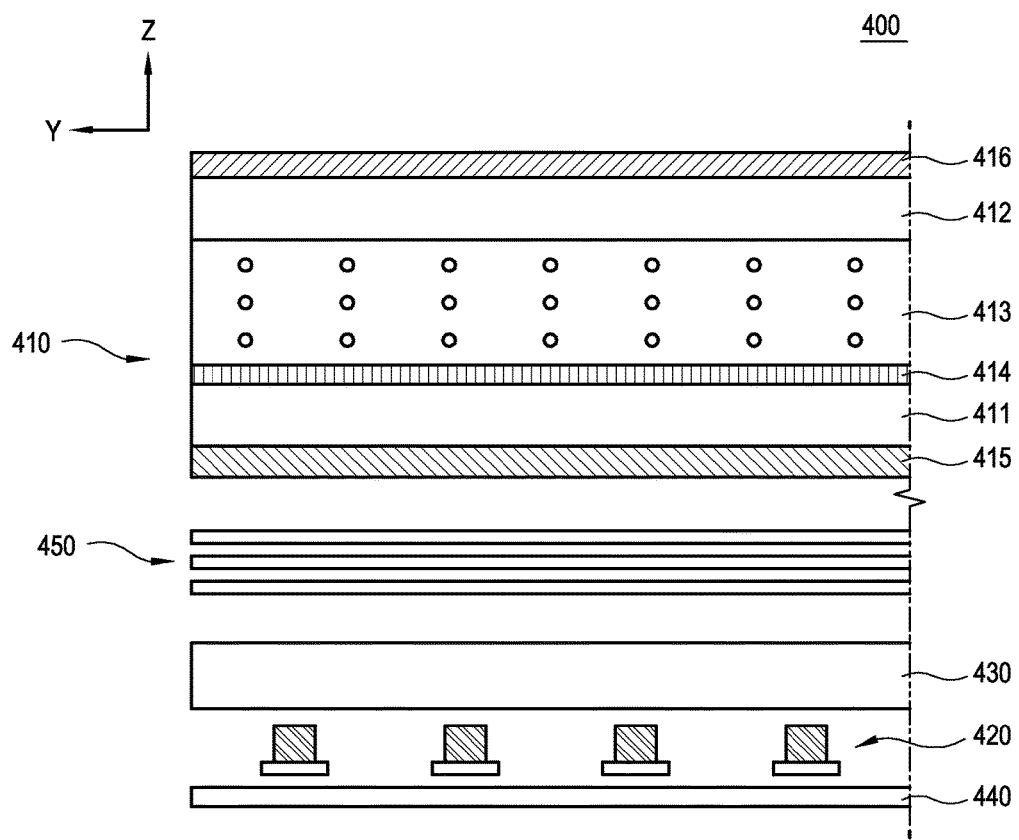
FIG. 7 is a partial cross-section view schematically showing a display apparatus according to a related art with respect to the exemplary embodiment in FIG. 1.

FIG. 7 is a partial cross-section view schematically showing a display apparatus 400 according to a related art with respect to the exemplary embodiment in FIG. 1.

As shown in FIG. 7, the display apparatus 400 includes a display panel 410, a light source 420, a light guide plate 430, a reflection plate 440, and an optical sheet 450. The display panel 410 includes a lower substrate 411, an upper substrate 412, a liquid crystal layer 413, a color filter 414, a lower polarization layer 415, and an upper polarization layer 416.

In general, all the elements except the light source 420 and the color filter 414 are substantially the same as those described above in the foregoing configurations, and thus repetitive descriptions thereof will be omitted for the sake of brevity. Although the light source 420 in this related art has the direct-type backlight structure, but is not limited thereto. Alternatively, the light source 420 may have the edge-type backlight structure.

According to this related art, the light source 420 emits blue light as opposed to white light. To this end, the light source 420 includes a blue LED. Further, the color filter 414 includes a quantum dot layer instead of the foregoing films colored with the dyes. That is, the color filter 414 according to this exemplary embodiment has a structure in which photons of the blue light collide with quantum dots to thereby generate light of RGB colors. In this exemplary embodiment, the color filter 414 is interposed in between the liquid crystal layer 413 and the lower substrate 411, but is not limited thereto. Alternatively, the color filter may be interposed in between the liquid crystal layer 413 and the upper substrate 412.

It should therefore be appreciated that contrary to the related art described above with reference to the display apparatus 300 (see FIG. 5), the present related art replaces the color filter 314 (see FIG. 5) having the films, which are colored with dyes, with the color filter 414 having the quantum dot structure, and includes the light source 420 which emits the blue light.

A principle of the quantum dot will be described in more detail below.

The quantum dot technology is applied to extend a color gamut of a liquid crystal display. The quantum dot is a highly-efficient phosphor crystal achieved by shaping a nano-scale semiconductor material into a molecular-sized sphere. If the photons of the blue light are pumped into the quantum dot, photons of a narrow spectrum distribution having a predetermined peak wavelength are emitted based on the size of the pumped quantum dot. With two optical properties, i.e., the narrow spectrum distribution and the tunability of the peak wavelength, the quantum dot makes the color filter 414 operate more efficiently so as to optimize the flux of the incident light, thereby providing a system having a large color gamut.

The quantum dot absorbs light having a short wavelength and emits light having a narrow spectrum in a long wavelength. As a result, the peak wavelength of the emitted light may be varied depending on the size of the quantum dot.

Figure 8:
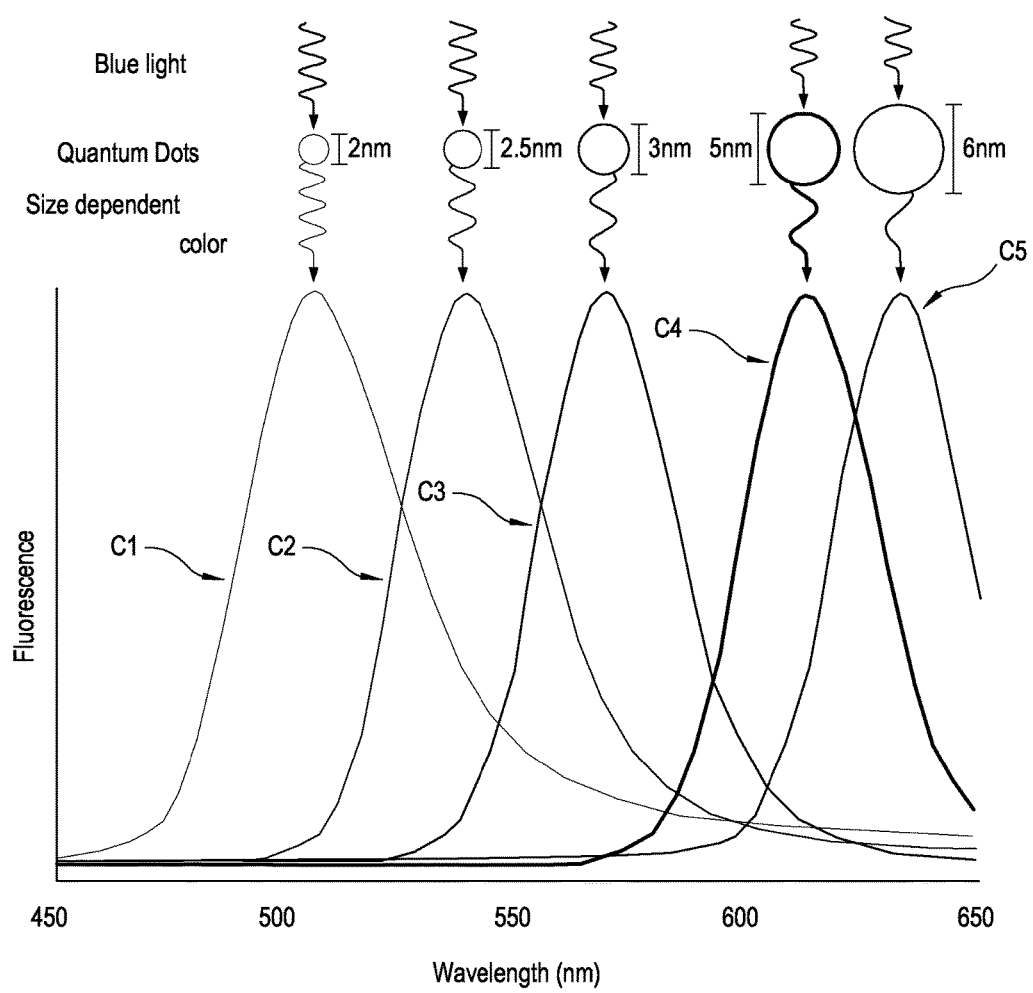
FIG. 8 is a schematic view illustrating a principle that light is generated according to respective colors when blue light collides with quantum dots having different diameters.

FIG. 8 schematically illustrates a principle that light is generated according to respective colors when the blue light collides with quantum dots having different diameters.

As shown in FIG. 8, if the photon of the blue light collides with a quantum dot having a diameter equal to or smaller than 3 nm, this quantum dot emits saturated green light. If the photon of the blue light collides with a quantum dot having a diameter greater than 3 nm but smaller than 7 nm, this quantum dot emits saturated red light.

For example, a curve C1 of the light emitted by a quantum dot having a diameter of 2 nm shows a color close to sky blue; a curve C2 of the light emitted by a quantum dot having a diameter of 2.5 nm shows a color of green mixed with blue; a curve C3 of the light emitted by a quantum dot having a diameter of 3 nm shows a color closer to green than the colors of C1 and C2; a curve C4 of the light emitted by a quantum dot having a diameter of 5 nm shows a color close to orange; and a curve C5 of the light emitted by a quantum dot having a diameter of 6 nm shows a more vivid red color.

For example, the blue light LED having a peak wavelength equal to or shorter than 445 nm can emit the green light having a peak wavelength equal to or shorter than 535 nm and a full-width half max (FWHM) equal to or shorter than 30 nm, and the red light having a peak wavelength equal to or shorter than 620 nm and an FWHM equal to or shorter than 35 nm. The FWHM is an expression of the extent of a function given by the difference between two extreme values of an independent variable at which a dependent variable is equal to half of its maximum value. By adjusting the size of the quantum dot, it is possible to tune the emitted light to a required wavelength within an allowable range of 1 nm.

Figure 9:
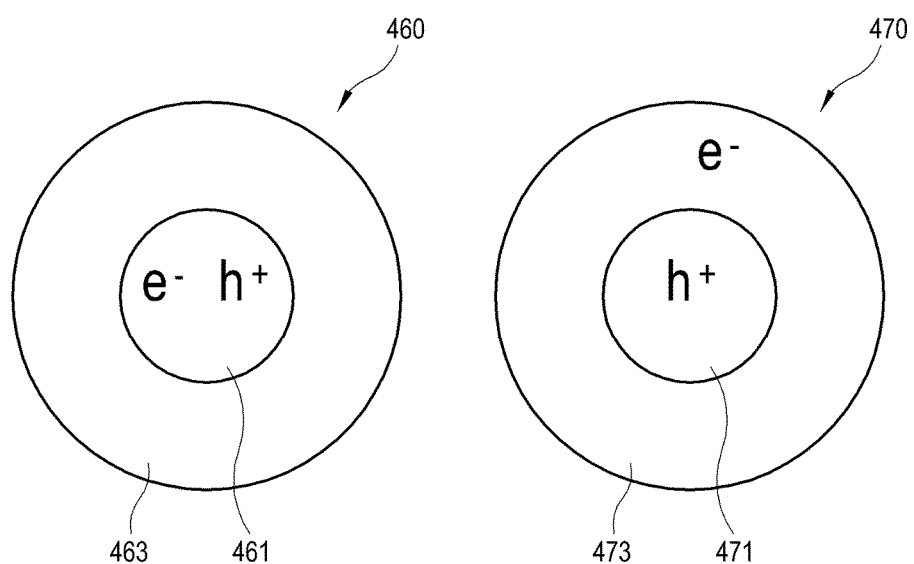
FIG. 9 is a schematic view illustrating two heterostructures of a quantum dot.

FIG. 9 schematically illustrates two heterostructures of quantum dots 460 and 470.

The quantum dots 460 and 470 may have a defect since the atomic distribution on their surface may be larger than that of a bulk material and may lose electrons since their energy states are high. To solve these problems, a heterostructure is employed. In the heterostructure, cores 461 and 471 of the quantum dots 460 and 470 are surrounded with shells 463 and 473 of a different material.

If the material of the shell 463 has a wider band gap than the material of the core 461, the quantum dot 460 has a type-I structure. For example, the core 461 may contain CdSe, and the shell 463 may contain ZnS.

If a valence band and a conduction band of the shell 473 and the material of the core 471 overlap, the quantum dot 470 has a type-II structure. For example, the core 471 may contain CdTe and the shell 473 may contain CdSe. In each of the type-I structure and the type-II structure, various materials may be used for the cores 461 and 471 and the shells 463 and 473 without limitation.

The type-I quantum dot 460 is used for increasing a light-emitting efficiency since there is no outside loss of an electron-hole pair generated in the core 461. On the other hand, the type-II quantum dot 470 is used as a material for a photoelectron device, such as a solar cell, since an electron and a hole are partially separated in the core 471 and the shell 473.

Figure 10:
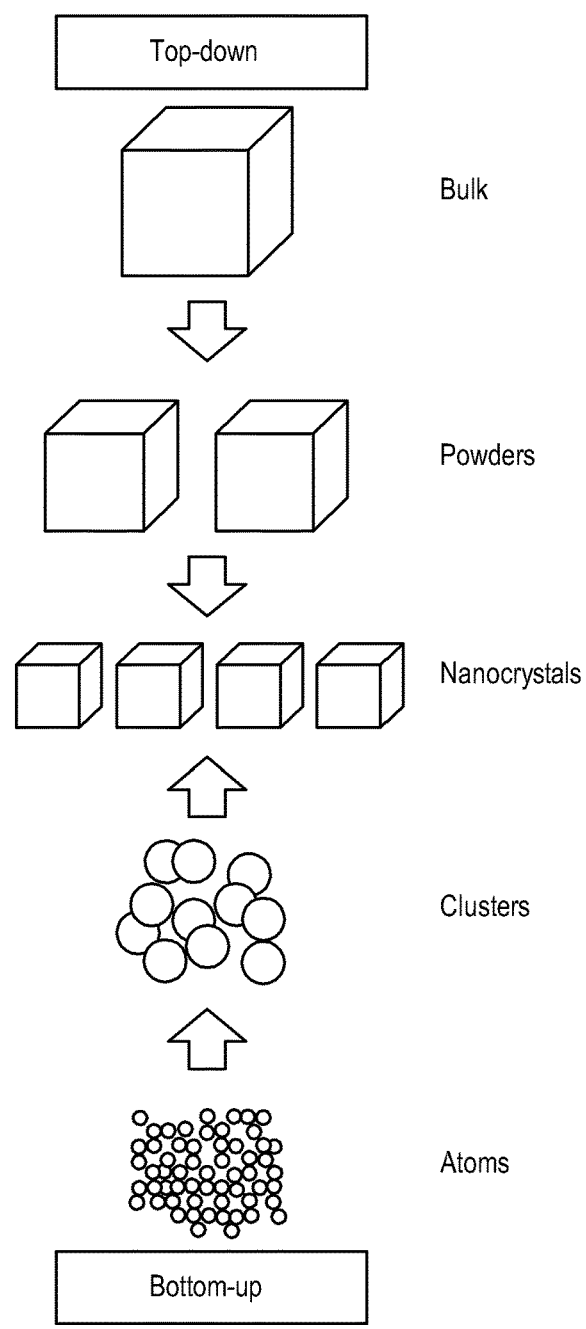
FIG. 10 is a schematic view illustrating a principle of manufacturing quantum dots.

FIG. 10 schematically illustrates a principle of fabricating the quantum dots.

As shown in FIG. 10, a method of fabricating the quantum dots is broadly divided into a 'top-down' method and a 'bottom-up' method.

The 'top-down' method refers to a method in which a bulk material is broken to make three-dimensional particles into a lower dimensional form. This method is generally achieved by lithography, and may provide the advantages of accurate adjustment in the size of nanoparticles and arrangement at a desired position. On the other hand, the top-down method may include problems associated with impurities, structural instability, and difficulty in making nanoparticles having a size equal to or smaller than 10 nm. In general, an exciton of a semiconductor nanoparticle has a Bohr radius smaller than 10 nm, and it may thus be difficult to form a quantum dot that is quantum-limited.

Here, the exciton is a quasiparticle that consists of an electron and a hole in an insulator or a semiconductor, i.e., an electron-hole pair coupled by electrostatic force. Further, the Bohr radius refers to a radius of a ground state in the Bohr model of the hydrogen atom.

The 'bottom-up' method refers to a method in which chemical molecules or atomic precursors are used to synthesize a quantum dot in a solution, thereby making up for the shortcomings of the 'top-down' method. As a representative 'bottom-up' method, there is a non-hydrolytic synthesis that is a synthesis in a colloidal solution, which uses organic organometallic compound for nucleation and crystal growth. In the non-hydrolytic synthesis, nucleation is uniformly induced by thermally decomposing organic metal in a hot coordinating solvent, and then a quantum dot is synthesized to have a uniform size and a regular internal structure through Ostwald ripening and annealing processes.

In synthesizing the quantum dot, the coordinating solvent combines with the surface of the quantum dot and acts as an energy barrier in the growth of the quantum dot. It is thus possible to control the size and shape of the quantum dot in accordance with the kinds of coordinating solvent.

Figure 11:
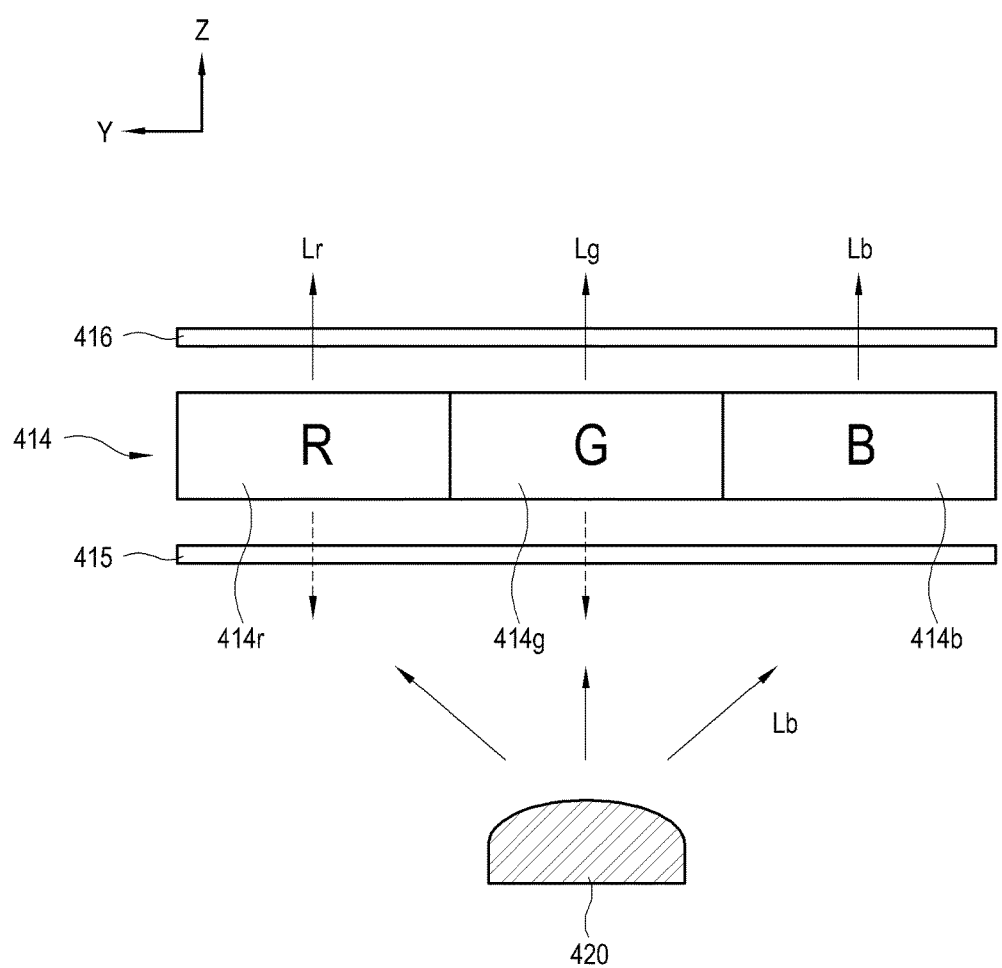
FIG. 11 is a schematic view illustrating a principle that a color filter filters the RGB colors out of blue light from a light source of the display apparatus of FIG. 7.

FIG. 11 schematically illustrates a principle that the color filter 414 filters the RGB colors out of the blue light Lb from the light source 420.

As shown in FIG. 11, the blue light Lb emitted from the light source 420 is primarily filtered for polarization by the lower polarization layer 415. The blue light Lb filtered for polarization by the lower polarization layer 415 is changed into the light having the RGB color by the color filter 414, and then secondarily filtered for polarization by the upper polarization layer 416.

The color filter 414 includes an R-sub pixel layer 414r, a G-sub pixel layer 414g, and a B-sub pixel layer 414b respectively corresponding to the RGB colors. The R-sub pixel layer 414r and the G-sub pixel layer 414g include quantum dots sized respectively corresponding to their colors. On the other hand, the B-sub pixel layer 414b does not include quantum dots, and is made of a transparent material through which the blue light Lb from the light source 420 is transmitted.

When the photons of the blue light Lb passed through the lower polarization layer 415 collide with the quantum dots of the R-sub pixel layer 414r and the G-sub pixel layer 414g, an energy loss occurs. This energy loss causes the red light Lr and the green light Lg to be emitted from the respective quantum dots. The color filter 414 does not absorb the photons when the quantum dots are applied to the color filter 414, and thus makes the optical efficiency higher than that of when the film colored with dye is used.

However, such a collision causes the following situations in the R-sub pixel layer 414r and the G-sub pixel layer 414g.

First, when the photons collide with the quantum dots, unpolarized light exits from the quantum dots. The blue light Lb entering the R-sub pixel layer 414r and the G-sub pixel layer 414g has been filtered by the lower polarization layer 415 in order to have a component polarized in a certain direction. As the blue light Lb collides with the quantum dots and becomes unpolarized, the light exiting from the R-sub pixel layer 414*r* and the G-sub pixel layer 414*g* is also unpolarized. Therefore, the quantum dots make the lower polarization layer 415 operate improperly, and may therefore lower the efficiency of the light exiting the upper polarization layer 416.

Second, when the photons collide with the quantum dots, the photons emitted from the quantum dots are scattered and thus travel in various directions including the Z direction in which normal photons travel. If the blue light Lb has been focused by the prism sheet or the like, the blue light Lb becomes out of focus, thereby lowering the optical efficiency.

Third, the photons emitted from the quantum dots may travel in the −Z direction opposite to the Z direction, i.e., toward the lower polarization layer 415. When this occurs, these photons may not travel in the Z direction again due to the lower polarization layer 415.

Due to these factors, optical losses may occur in the display apparatus 400 (see FIG. 7) with the color filter 414 because of the properties of the quantum dots. Although there may be differences in accordance with environments of the display apparatus 400, an optical efficiency of about 40% is achieved in this related art, which is higher than the optical efficiency of 33% (⅓) achieved in the case described above with reference to the display apparatus 300. The optical efficiency according to this related art is thus improved as compared to that of the case described above with reference to the display apparatus 300, but may provide the foregoing factors.

Exemplary embodiments for addressing the foregoing factors will be described in more detail below.

Figure 12:
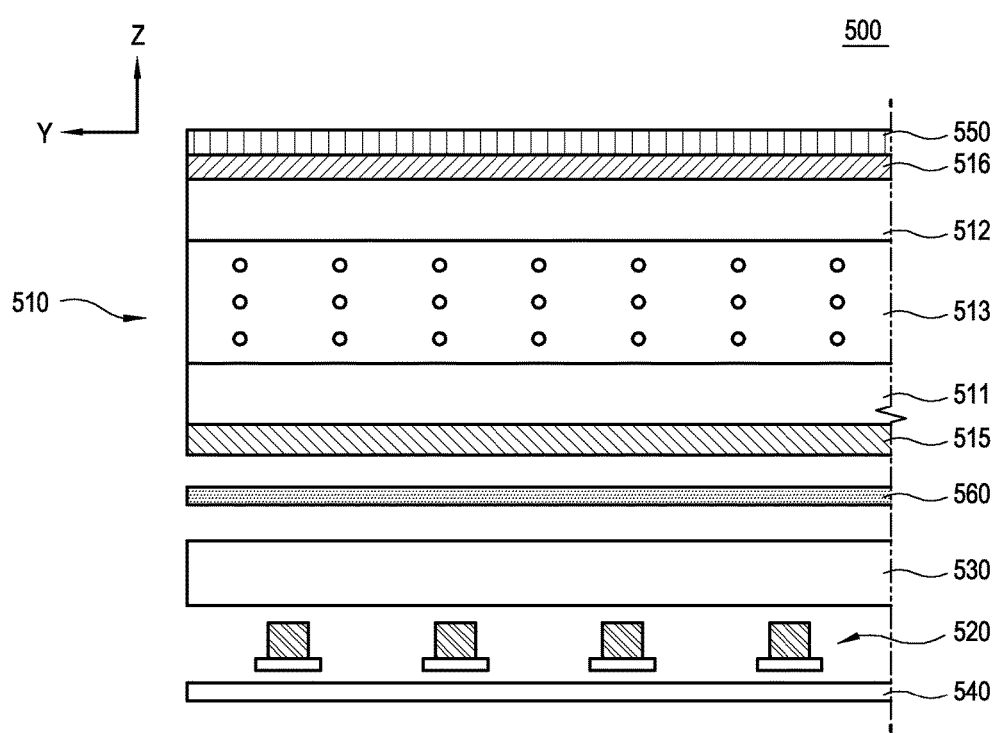
FIG. 12 is a partial cross-section view schematically showing a display apparatus according to an exemplary embodiment.

FIG. 12 is a partial cross-section view schematically showing a display apparatus 500 according to an exemplary embodiment.

As shown in FIG. 12, the display apparatus 500 according to this exemplary embodiment includes a display panel 510, a light source 520, a light guide plate 530, a reflection plate 540, and a DBEF 560. The display panel 510 includes a lower substrate 511, an upper substrate 512, a liquid crystal layer 513, a lower polarization layer 515, and an upper polarization layer 516. These elements perform substantially the same functions as those of the previous exemplary embodiments, and thus repetitive descriptions thereof will be omitted for the sake of brevity.

According to this exemplary embodiment, the light source 520 emits blue light. Further, the display apparatus 500 includes a color filter 550 stacked on the outmost surface of the display panel 510, i.e., the top surface of the upper polarization layer 516. The color filter 550 includes quantum dots configured to emit green light and red light as a result of the blue light colliding with the quantum dots as described above with reference to the display apparatus 400.

In comparison with the exemplary embodiment described above with reference to the display apparatus 400, the color filter 550 according to this exemplary embodiment is arranged on the outmost surface of the display panel 510, i.e., the top surface of the upper polarization layer 516, as opposed to being arranged between the lower polarization layer 515 and the upper polarization layer 516. Thus, the color filter 550 according to this exemplary embodiment prevents the light filtered for polarization by the lower polarization layer 515 from becoming unpolarized before passing through the upper polarization layer 516, thereby improving the optical efficiency.

Figure 13:
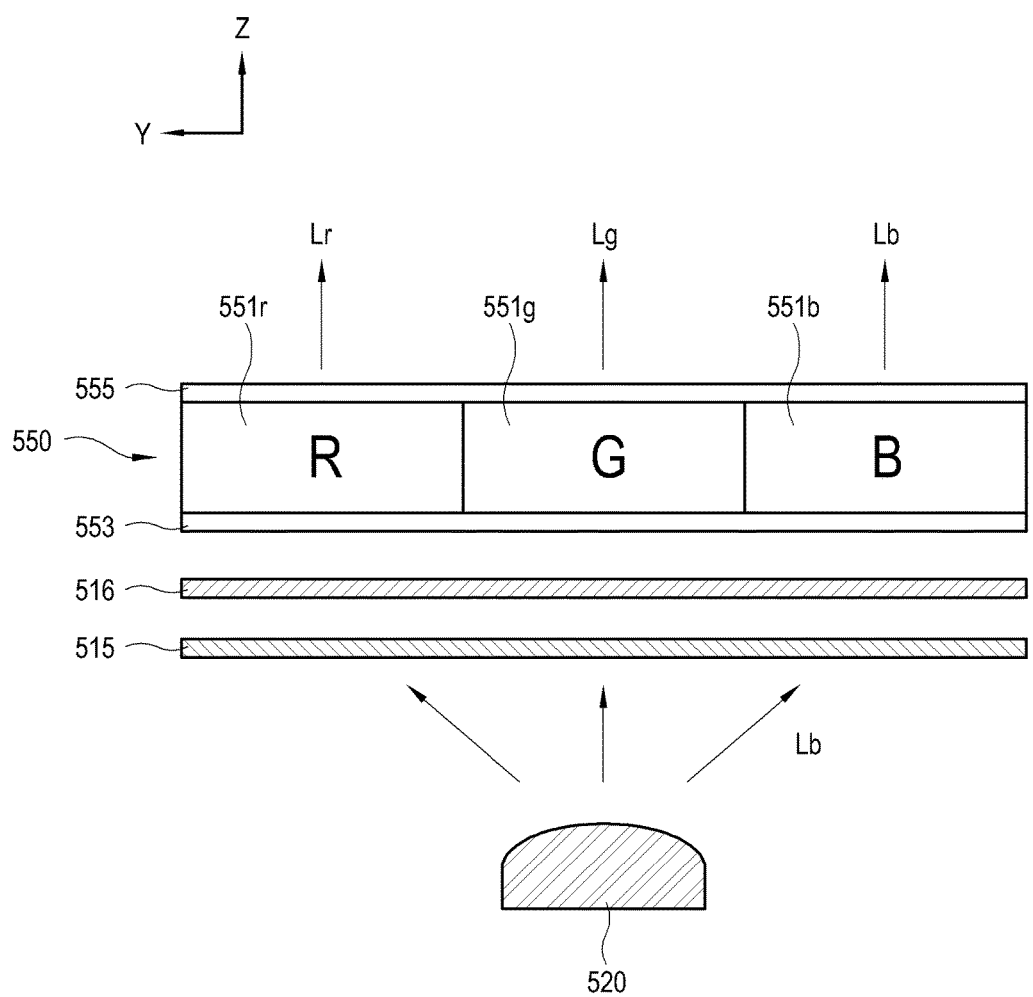
FIG. 13 is a schematic view illustrating a principle that a color filter filters the RGB colors out of blue light from a light source of the display apparatus of FIG. 12.

FIG. 13 schematically illustrates a principle that the color filter 550 filters the RGB colors out of the blue light Lb from the light source 520.

As shown in FIG. 13, the blue light Lb emitted from the light source 520 is first filtered for polarization by the lower polarization layer 515, and then filtered for polarization by the upper polarization layer 516. The blue light Lb exiting the upper polarization layer 516 then enters the color filter 550.

The color filter 550 includes an R-sub pixel layer 551*r*, a G-sub pixel layer 551*g*, and a B-sub pixel layer 551*b*, which respectively correspond to the RGB colors; a lower barrier layer 553 covering the bottom surfaces of the sub pixel layers 551*r*, 551*g* and 551*b*; and an upper barrier layer 555 covering the top surfaces of the sub pixel layers 551*r*, 551*g* and 551*b*.

The R-sub pixel layer 551*r* and the G-sub pixel layer 551*g* include quantum dots sized respectively corresponding to their colors. On the other hand, the B-sub pixel layer 551*b* does not include quantum dots, and is made of a transparent material through which the blue light Lb from the light source 420 is transmitted.

When the photons of the blue light Lb collide with the quantum dots of the R-sub pixel layer 551*r* and the G-sub pixel layer 551*g*, the red light Lr and the green light Lg are respectively emitted from their corresponding quantum dots. As discussed above, the red light Lr and the green light Lg which is emitted from the quantum dots is unpolarized. Since the color filter 550 in this exemplary embodiment is arranged outside the upper polarization layer 516, there is no decrease in the optical efficiency even though the red light Lr and the green light Lg become unpolarized.

Therefore, the display apparatus 500 having the color filter 550 arranged according to this exemplary embodiment provides improved optical efficiency compared to that of the case described above with reference to the display apparatus 400.

However, this exemplary embodiment also has a problem that the red light Lr and the green light Lg may partially travel in the −Z direction as a result of the collision with the quantum dots of the R-sub pixel layer 551*r* and the G-sub pixel layer 551*g*. This phenomenon still causes optical loss. Thus, exemplary embodiments for decreasing the amount of red light Lr and green light Lg traveling in the −Z direction in the R-sub pixel layer 551*r* and the G-sub pixel layer 551*g* will be described in more detail below.

Figure 14:
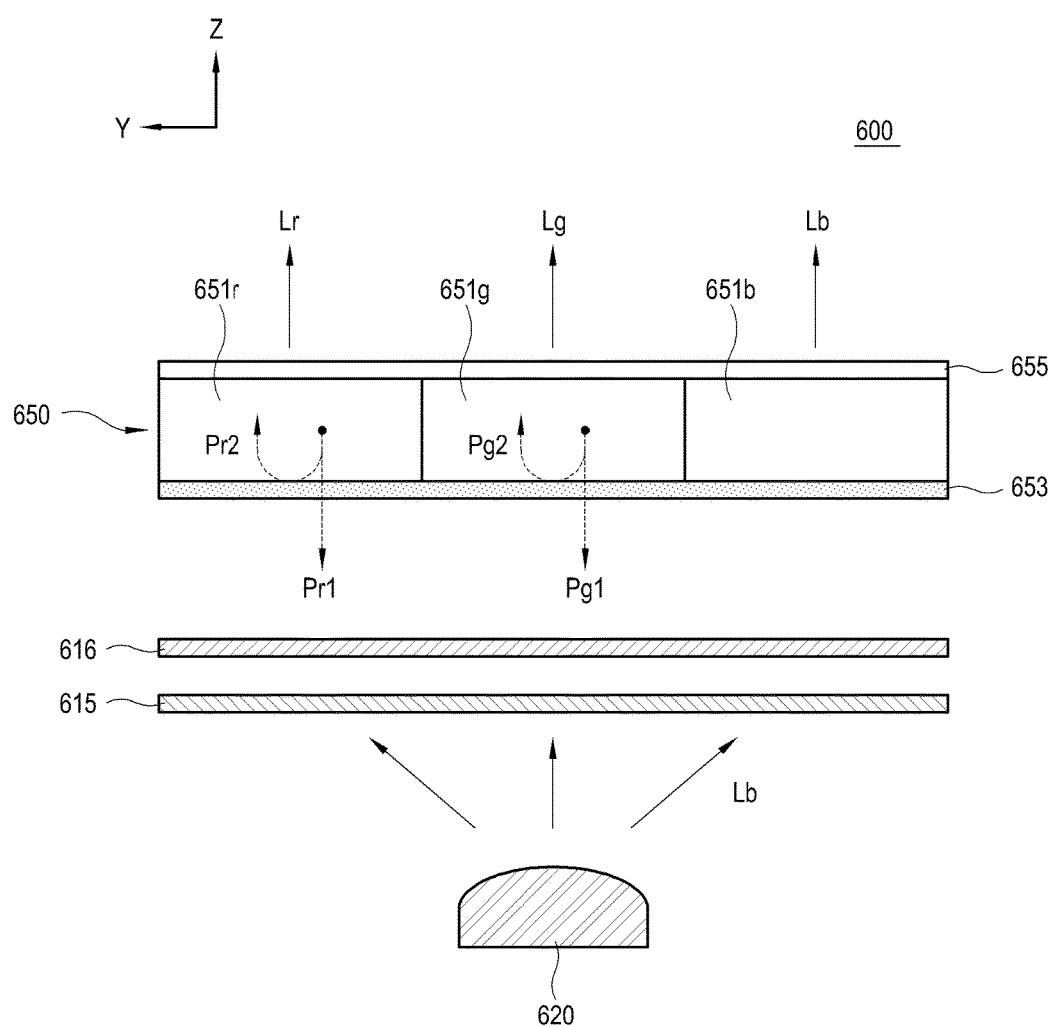
FIG. 14 is a schematic view illustrating a principle that a color filter filters the RGB colors out of blue light from a light source of a display apparatus according to an exemplary embodiment.

FIG. 14 schematically illustrates a principle that a color filter 650 filters the RGB colors out of the blue light Lb from a light source 620 of a display apparatus 600 according to an exemplary embodiment.

As shown in FIG. 14, the display apparatus 600 according to this exemplary embodiment includes the light source 620, a lower polarization layer 615, an upper polarization layer 616, and a color filter 650. These elements of the display apparatus 600, except for the color filter 650, are substantially the same as those described above with reference to the display apparatus 500 (see FIG. 12), and thus repetitive descriptions thereof will be omitted for the sake of brevity.

The blue light Lb emitted from the light source 620 is first filtered for polarization by the lower polarization layer 615, and then filtered for polarization by the upper polarization layer 616. The blue light Lb exiting the upper polarization layer 616 then enters the color filter 650.

The color filter 650 includes an R-sub pixel layer 651*r*, a G-sub pixel layer 651*g*, and a B-sub pixel layer 651*b*, respectively corresponding to the RGB colors; a lower barrier layer 653 covering the bottom surfaces of the sub pixel layers 651*r*, 651*g* and 651*b*; and an upper barrier layer 655 covering the top surfaces of the sub pixel layers 651*r*, 651*g* and 651*b*.

The R-sub pixel layer 651*r* and the G-sub pixel layer 651*g* include quantum dots sized respectively corresponding to their colors. On the other hand, the B-sub pixel layer 651*b* does not include quantum dots and is made of a transparent material through which the blue light Lb from the light source 620 is transmitted.

Contrary to the color filter 550 (see FIG. 13) described above with reference to the display apparatus 500, the color filter 650 according to this exemplary embodiment includes a DBEF in the lower barrier layer 653 of the color filter 650. That is, the lower barrier layer 653 transmits first polarized components Pr1 and Pg1 of the light emitted from the quantum dots and traveling in the −Z direction, but reflects the second polarized components Pr2 and Pg2, which are perpendicular to the first polarized components Pr1 and Pg1, in the z direction. The red light Lr and the green light Lg of the second polarized components Pr2 and Pg2 reflected by the lower barrier layer 653 then exit from the color filter 650 in the Z direction.

Specifically, when the blue light Lb enters the R-sub pixel layer 651*r* and collides with the quantum dots, the red light Lr is emitted from the corresponding quantum dots in the Z direction and the −Z direction. The red light Lr emitted in the −Z direction includes the first polarized component Pr1 and the second polarized component Pr2, which are orthogonal to each other. The lower barrier layer 653 reflects the red light Lr of the second polarized component Pr2 in the Z direction.

Further, when the blue light Lb enters the G-sub pixel layer 651*g* and collides with the quantum dots, the green light Lg is emitted from the corresponding quantum dots in the Z direction and the −Z direction. The green light Lg emitted in the −Z direction includes the first polarized component Pg1 and the second polarized component Pg2, which are orthogonal to each other. The lower barrier layer 653 reflects the green light Lg of the second polarized component Pr2 in the Z direction.

On the other hand, the B-sub pixel layer 651*b* does not include quantum dots and directly transmits the blue light Lb, and thus there is no reflection of the light in the lower barrier layer 653.

In this manner, the color filter 650 according to this exemplary embodiment includes the lower barrier layer 653 achieved by the DBEF formed on the surface for receiving the blue light Lb from the light source 620. Thus, a part of light emitted from the R-sub pixel layer 651*r* and the G-sub pixel layer 651*g* of the color filter 650 in a second direction opposite to a first direction is at least partially reflected toward the first direction. Thus, it is possible to reduce the optical loss that occurs in the R-sub pixel layer 651*r* and the G-sub pixel layer 651*g*.

The lower barrier layer 653 including the DBEF according to this exemplary embodiment is configured to cover the entire bottom surface of each sub pixel layer 651*r*, 651*g* and 651*b*. Exemplary embodiments different in structure in this aspect from this exemplary embodiment will be described in more detail below.

Figure 15:
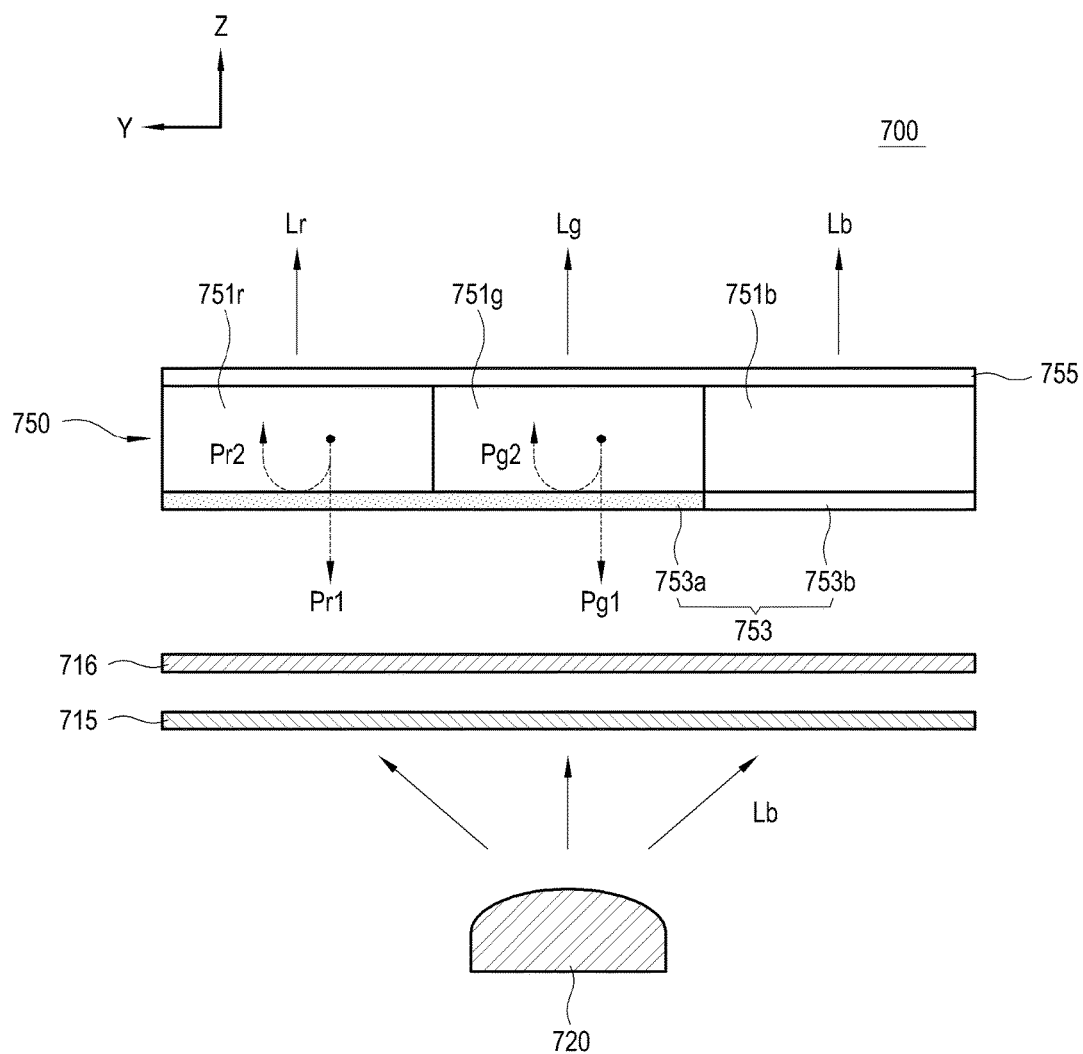
FIG. 15 is a schematic view illustrating a principle that a color filter filters the RGB colors out of blue light from a light source of a display apparatus according to an exemplary embodiment.

FIG. 15 schematically illustrates a principle that a color filter 750 filters the RGB colors out of the blue light Lb from a light source 720 of a display apparatus 700 according to an exemplary embodiment.

As shown in FIG. 15, the display apparatus 700 according to this exemplary embodiment includes the light source 720, a lower polarization layer 715, an upper polarization layer 716, and a color filter 750. These elements of the display apparatus 700, except for the color filter 750, are substantially the same as those described above with reference to the display apparatus 500 (see FIG. 12), and thus repetitive descriptions thereof will be omitted for the sake of brevity.

The blue light Lb emitted from the light source 720 is first filtered for polarization by the lower polarization layer 715, and then filtered for polarization by the upper polarization layer 716. The blue light Lb exiting the upper polarization layer 716 then enters the color filter 750.

The color filter 750 includes an R-sub pixel layer 751*r*, a G-sub pixel layer 751*g*, and a B-sub pixel layer 751*b* respectively corresponding to the RGB colors; a lower barrier layer 753 covering the bottom surfaces of the sub pixel layers 751*r*, 751*g* and 751*b*; and an upper barrier layer 755 covering the top surfaces of the sub pixel layers 751*r*, 751*g* and 751*b*.

As compared with the color filter 650 (see FIG. 14) of the display apparatus 600, the color filter 750 according to this exemplary embodiment includes the lower barrier layer 753 which has a different structure from the lower barrier layer 653 (see FIG. 14).

The lower barrier layer 753 according to this exemplary embodiment includes a DBEF area 753*a* having a DBEF which covers an area corresponding to the R-sub pixel layer 751*r* and the G-sub pixel layer 751*g*, and a transmission area 753*b* having no DBEF which covers an area corresponding to the B-sub pixel layer 751*b*.

The DBEF area 753*a* transmits first polarized components Pr1 and Pg1 of the light exiting from the quantum dots in the −Z direction due to a collision with the blue light Lb in the R-sub pixel layers 751*r* and the G-sub pixel layer 751*g*, but reflects second polarized components Pr2 and Pg2 perpendicular to the first polarized components Pr1 and Pg1 in the Z direction.

The transmission area 753*b* allows the blue light Lb entering the B-sub pixel layer 751*b* to directly exit from the B-sub pixel layer 751*b*. Since the phenomena in the R-sub pixel layer 751*r* and the G-sub pixel layer 751*g* does not occur in the B-sub pixel layer 751*b*, the transmission area 753*b* includes no DBEF.

In the exemplary embodiments described above with reference to the display apparatuses 600 and 700, the light directly emitted from the color filters 650 and 750 in the −Z direction has the first polarized components Pr1 and Pg1. Since the first polarized components Pr1 and Pg1 have already been filtered for polarization in a certain direction by the lower barrier layers 653 and 753, the first polarized components Pr1 and Pg1 are blocked by the polarization layers 615, 616, 715 and 716 and are thus not reflected again toward the Z direction. Therefore, according to these exemplary embodiments, there is a loss in the light corresponding to the first polarized components Pr1 and Pg1.

Exemplary embodiments for decreasing such an optical loss will be described in more detail below.

Figure 16:
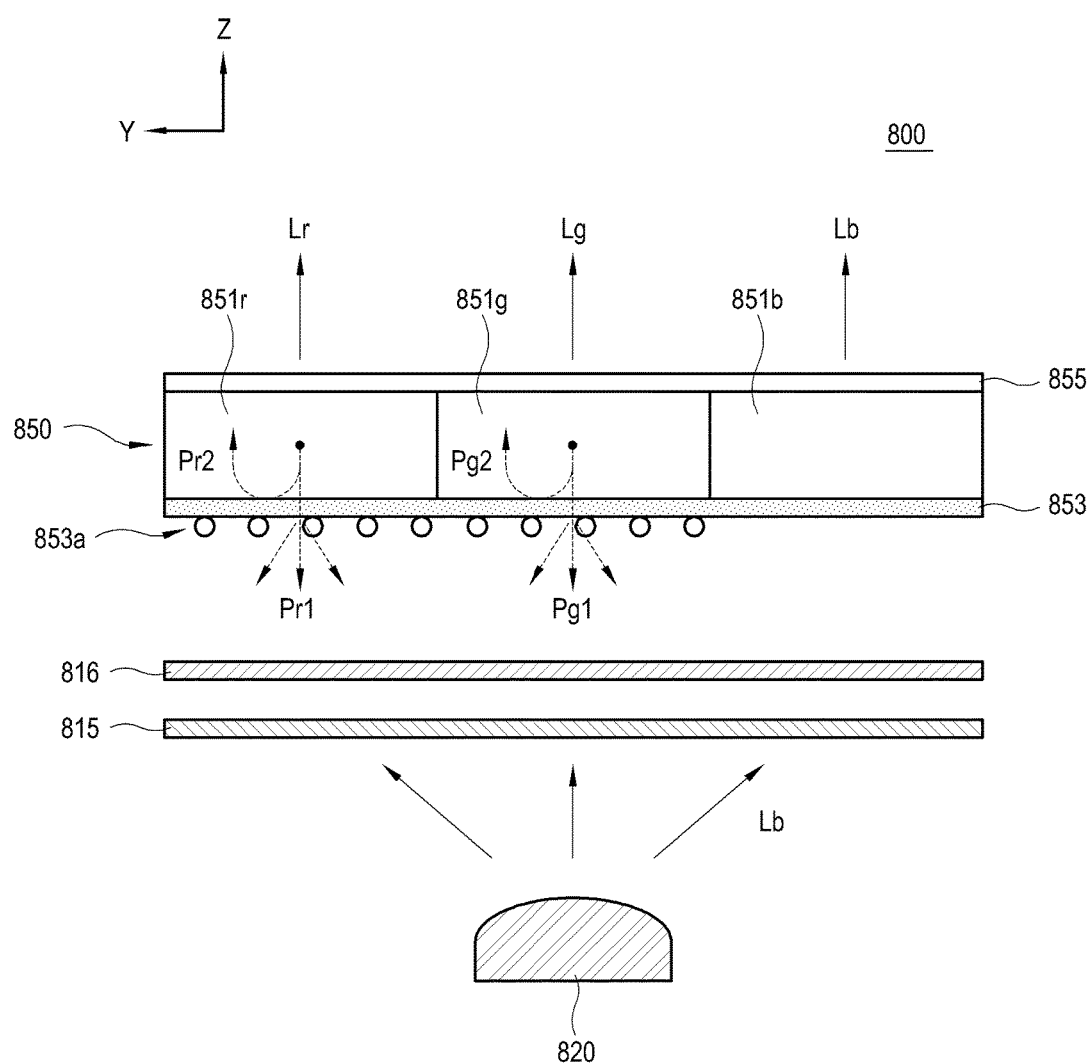
FIG. 16 is a schematic view illustrating a principle that a color filter filters the RGB colors out of blue light from a light source of a display apparatus according to an exemplary embodiment.

FIG. 16 schematically illustrates a principle that a color filter 850 filters the RGB colors out of the blue light Lb from a light source 820 of a display apparatus 800 according to an exemplary embodiment.

As shown in FIG. 16, the display apparatus 800 according to this exemplary embodiment includes the light source 820, a lower polarization layer 815, an upper polarization layer 816, and the color filter 850. These elements of the display apparatus 800, except the color filter 850, are substantially the same as those described above with reference to the display apparatus 500 (see FIG. 12), and thus repetitive descriptions thereof will be omitted for the sake of brevity.

The blue light Lb emitted from the light source 820 is first filtered for polarization by the lower polarization layer 815, and then filtered for polarization by the upper polarization layer 816. The blue light Lb exiting the upper polarization layer 816 then enters the color filter 850.

The color filter 850 includes an R-sub pixel layer 851r, a G-sub pixel layer 851g, and a B-sub pixel layer 851b respectively corresponding to the RGB colors; a lower barrier layer 853 covering the bottom surfaces of the sub pixel layers 851r, 851g and 851b; and an upper barrier layer 855 covering the top surfaces of the sub pixel layers 851r, 851g and 851b.

As compared with the color filter 650 (see FIG. 14) of the display apparatus 600, the color filter 850 according to this exemplary embodiment includes the lower barrier layer 853, the bottom surface of which may be subjected to a process for light diffusion with respect to areas corresponding to the R-sub pixel layer 851r and the G-sub pixel layer 851g.

The process for light diffusion is configured to scatter and diffuse light exiting from the color filter 850 in the −Z direction such that the light may become unpolarized. For example, the process for light diffusion may be achieved by a method of applying beads 853a to a bottom surface of the lower barrier layer 853 similar to a method of manufacturing a diffusion sheet. In addition, the process for light diffusion may be achieved by a method of forming preset diffusion patterns on the bottom surface of the lower barrier layer 853.

From the discussion above, it should be appreciated that the process for light diffusion is not required for an area corresponding to the B-sub pixel layer 851b on the bottom surface of the lower barrier layer 853.

Suppose that there is a red light Lr traveling from the R-sub pixel layer 851r in the −Z direction and having the first polarized component Pr1 and the second polarized component Pr2 perpendicular to each other. The lower barrier layer 853 reflects the second polarized component Pr2 of the red light Lr in the Z direction, but allows the first polarized component Pr1 to travel in the −Z direction. The first polarized component Pr1 is diffused and scattered by the bottom surface of the lower barrier layer 853, in which the bottom surface has been subjected to the process for light diffusion. The light, the first polarized component Pr1 of which is diffused, is then recycled and enters the color filter 850 again.

Likewise, suppose that there is a green light Lg traveling from the G-sub pixel layer 851g in the −Z direction and having the first polarized component Pg1 and the second polarized component Pg2 perpendicular to each other. The second polarized component Pg2 of the green light Lg is reflected by the lower barrier layer 853 toward the Z direction, and the first polarized component Pr1 is diffused and scattered by the bottom surface of the lower barrier layer 853, in which the bottom surface has been subjected to the process for light diffusion. The light, the first polarized component Pg1 of which is diffused, is then recycled and enters the color filter 850 again.

Thus, the color filter 850 according to this exemplary embodiment diffuses the polarized components Pr1 and Pg1 of the light, which are not reflected by the lower barrier layer 853 having the DBEF, so as to be recycled in the display apparatus 800. Thus, the optical efficiency according to the present exemplary embodiment is improved compared to that of the exemplary embodiment described above with reference to the display apparatus 600.

The exemplary embodiment described above with reference to the display apparatus 500 (see FIG. 12) discloses the structure wherein the DBEF 560 is interposed in between the light guide plate 530 and the lower polarization layer 515. In this manner, the optical efficiency may be improved by the DBEF 560, but the traveling direction of the light is likely to deviate from the Z direction. Therefore, it may be difficult to control the RGB colors to have suitable proportions among them. Exemplary embodiments for solving this problem will be described in more detail below.

Figure 17:
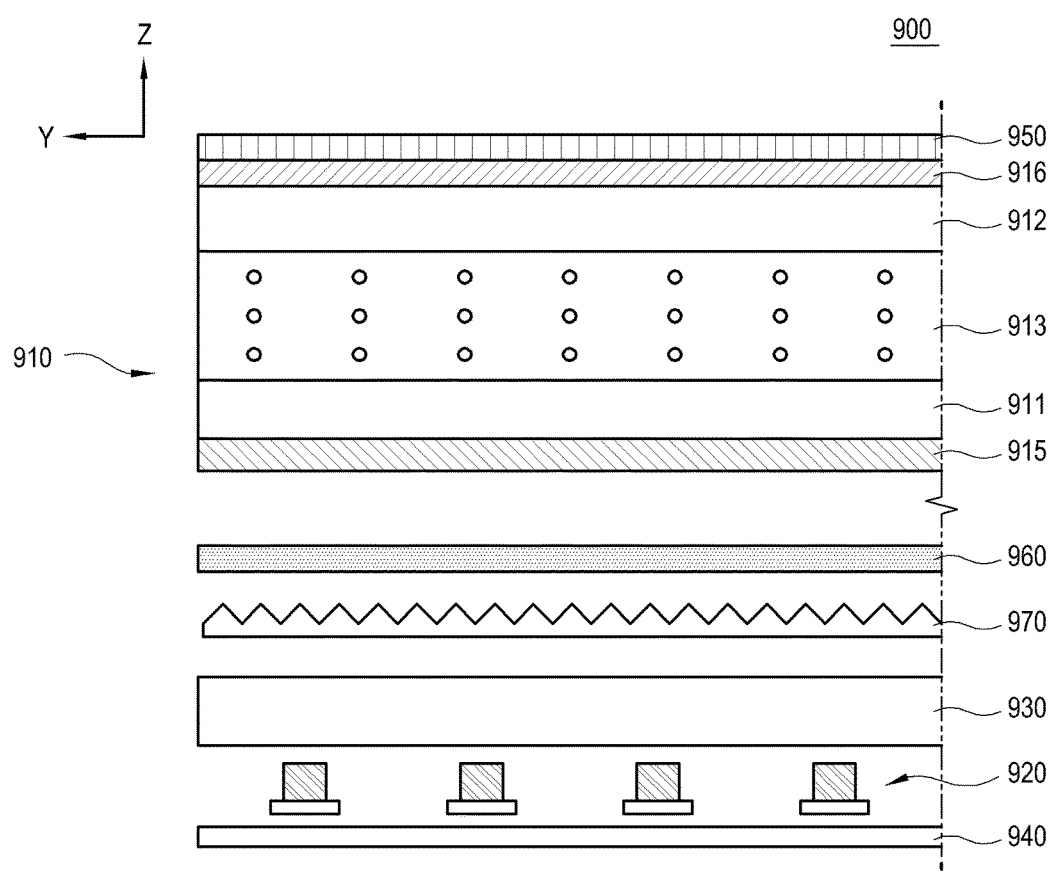
FIG. 17 is a partial cross-section view schematically showing a display apparatus according to an exemplary embodiment.

FIG. 17 is a partial cross-section view schematically showing a display apparatus 900 according to an exemplary embodiment.

As shown in FIG. 17, the display apparatus 900 according to this exemplary embodiment includes a display panel 910, a light source 920, a light guide plate 930, a reflection plate 940, a color filter 950, and a DBEF 960. The display panel 910 includes a lower substrate 911, an upper substrate 912, a liquid crystal layer 913, a lower polarization layer 915, and an upper polarization layer 916. These elements perform substantially the same functions as those of the foregoing exemplary embodiments, and thus repetitive descriptions thereof will be omitted for the sake of brevity.

It should be appreciated, that the color filter 950 may include the elements described in the foregoing exemplary embodiments.

The display apparatus 900 according to this exemplary embodiment additionally includes a prism sheet 970 between the light guide plate 930 and the lower polarization layer 915. The prism sheet 970 may be arranged beneath or on the DBEF 960. The display apparatus 900 may additionally include a diffusion sheet on the light guide plate 930 as necessary.

The prism sheet 970 focuses the blue light exiting the light guide plate 930 in a direction normal to the surface of the display panel 910. Thus, it is possible to easily control the amount of light entering the sub pixel layers according to the RGB colors of the color filter 950.

From the foregoing exemplary embodiments it should be appreciated that a polarizing film may be applied to the lower polarization layer and the upper polarization layer of the display panel, and that a DBEF may be applied to the lower barrier layer of the color filter having the quantum dots. However, some exemplary embodiments may include a linear grid (or wire grid) structure for polarization. In such embodiments, the display apparatus may have an internal structure different from that of the foregoing exemplary embodiments. Exemplary embodiments of such structures will be described in more detail below.

Figure 18:
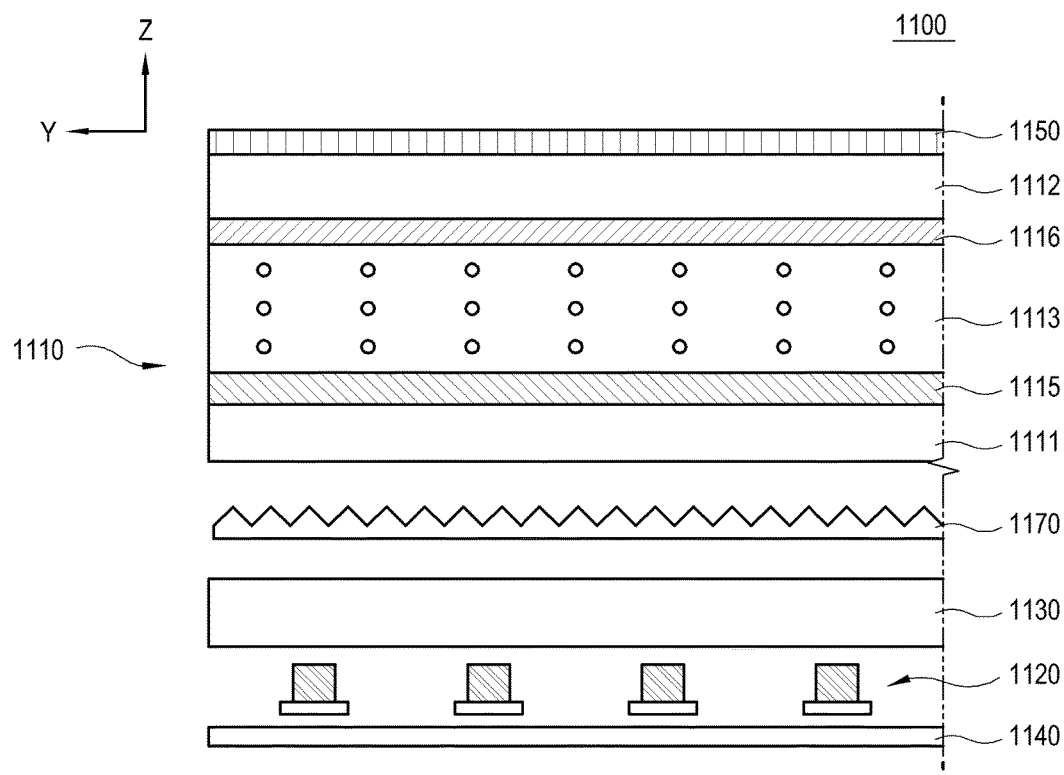
FIG. 18 is a partial cross-section view schematically showing a display apparatus according to an exemplary embodiment.

FIG. 18 is a partial cross-section view schematically showing a display apparatus 1100 according to an exemplary embodiment.

As shown in FIG. 18, the display apparatus 1100 according to this exemplary embodiment includes a display panel 1110, a light source 1120, a light guide plate 1130, a reflection plate 1140, a color filter 1150, and a prism sheet 1170. The light source 1120, the light guide plate 1130, the reflection plate 1140, and the prism sheet 1170 are substantially similar to those of the foregoing exemplary embodiments, and thus repetitive descriptions thereof will be omitted for the sake of brevity.

The display panel 1110 includes a lower substrate 1111, an upper substrate 1112, a liquid crystal layer 1113, a lower polarization layer 1115, and an upper polarization layer 1116. The lower substrate 1111, the upper substrate 1112, and the liquid crystal layer 1113 are substantially similar to those of the foregoing exemplary embodiments, and thus repetitive descriptions thereof will be omitted for the sake of brevity.

In this exemplary embodiment, the lower polarization layer 1115 and the upper polarization layer 1116 comprise linear grid structures respectively formed on the top surface of the lower substrate 1111 and the bottom surface of the upper substrate 1112. Each linear grid includes a plurality of bars extending in common direction. Since the polarized component which passes through the lower polarization layer 1115 is perpendicular to the polarized component which passes through the upper polarization layer 1116, the common extending direction of the linear grid of the lower polarization layer 1115 is orthogonal to the common extending direction of the linear grid of the upper polarization layer 1116.

The respective bars that constitute the linear grid are arranged to have pitches at preset intervals and extend in a direction corresponding to each polarization direction. In addition, the linear grid of the upper polarization layer 1116 protrudes from the upper substrate 1112 toward the liquid crystal layer 1113, and the linear grid of the lower polarization layer 1115 protrudes from the lower substrate 1111 toward the liquid crystal layer 1113. The linear grids will be described in more detail below.

Contrary to the foregoing film-type polarization layers, the lower polarization layer 1115 and the upper polarization layer 1116 are directly formed on the lower substrate 1111 and the upper substrate 1112 by an etching process or the like, and are placed inside the lower substrate 1111 and the upper substrate 1112.

Due to the properties of the linear grids, the lower polarization layer 1115 and the upper polarization layer 1116 reflect the untransmitted polarized component as opposed to absorbing the untransmitted polarized component. That is, the lower polarization layer 1115 and the upper polarization layer 1116 according to this exemplary embodiment serve as the DBEF. As a result, it is possible to omit the DBEF film or DBEF structure from the display apparatus 1100.

The linear grid structure of the lower polarization layer 1115 will now be described in more detail.

Figure 19:
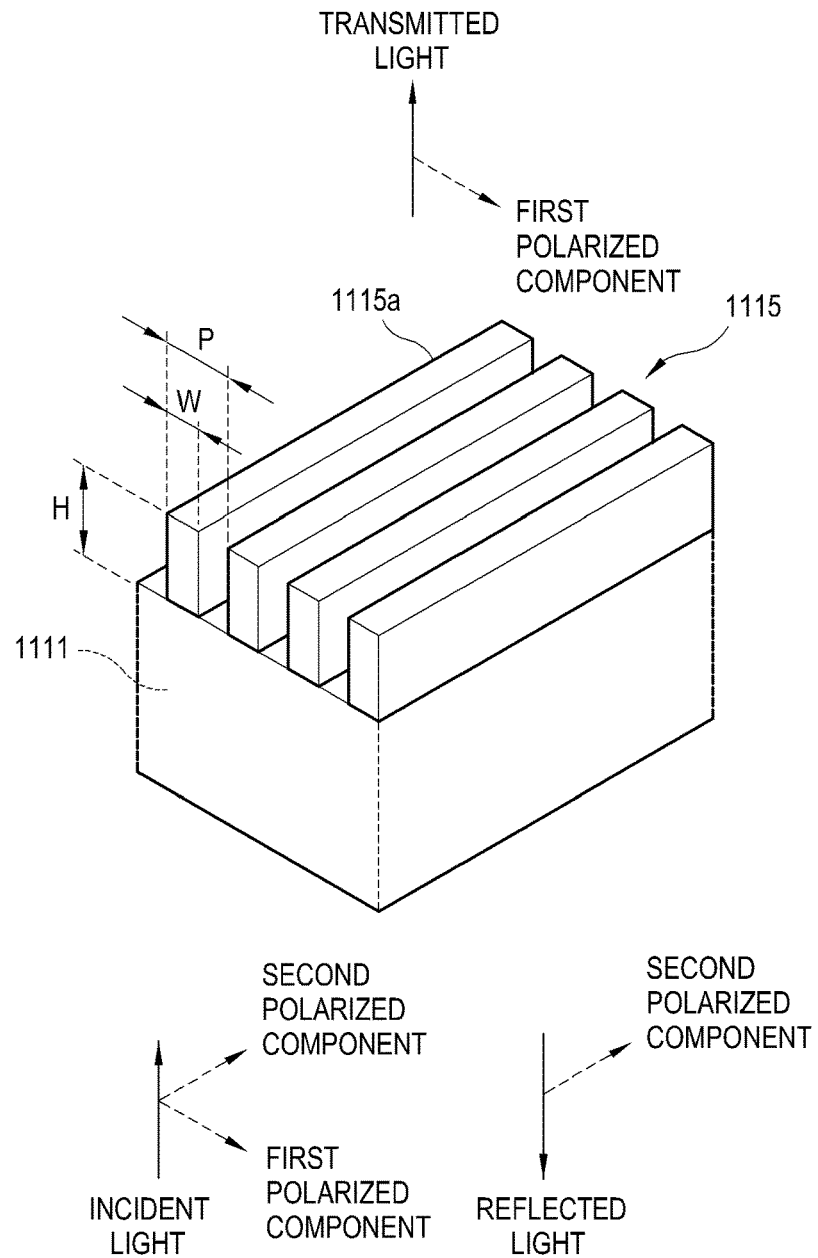
FIG. 19 is a partial perspective view of a portion of a lower polarization layer of the display apparatus of FIG. 18.

FIG. 19 is a partial perspective view showing a portion of the lower polarization layer 1115.

As shown in FIG. 19, the lower polarization layer 1115 comprises a plurality of bars 1115a arranged on the lower substrate 1111. The bars 1115a extend in a common direction parallel to one another. Each bar 1115a has a predetermined height H and a predetermined width W. The bars 1115a are periodically arranged with a predetermined pitch P therebetween.

If the pitch P of the linear grid structure is adjusted to half a wavelength of light, only transmitted light and reflected light are present without diffracted light. Slits are formed between adjacent bars 1115a within the linear grid, and the first polarized component in the first polarization direction perpendicular to the common extending direction of the bars 1115a passes through the lower polarization layer 1115 while incident light passes through the slits. On the other hand, the second polarized component in the second polarization direction parallel to the common extending direction of the bars 1115a does not pass through the lower polarization layer 1115 and is thus reflected in the incident direction. That is, with this linear grid structure, the light passing through the lower polarization layer 1115 is polarized in the first polarization direction.

The light reflected without passing through the lower polarization layer 1115 is reflected together with the emitted light of the light source 1120 (see FIG. 18) from the reflective plate 1140 (see FIG. 18) toward the lower polarization layer 1115. As a result, the optical efficiency of the display panel 1110 may be improved without using the DBEF since the light filtered without passing through the lower polarization layer 1115 can be reused.

To improve the polarization filtering performance of the lower polarization layer 1115, a ratio of the width W to the height H of the bars 1115a, i.e., an aspect ratio, may be equal to or greater than 1:3.

The upper polarization layer 1116 (see FIG. 18) has a linear grid structure similar to that of the lower polarization layer 1115, however, the linear grid of the upper polarization layer 1116 (see FIG. 18) extends in a direction perpendicular to the linear grid of the lower polarization layer 1115. Thus, the upper polarization layer 1116 (see FIG. 18) transmits only the second polarized component and does not transmit the first polarized component.

The structure of the bars forming the linear grids will now be described in more detail.

Figure 20:
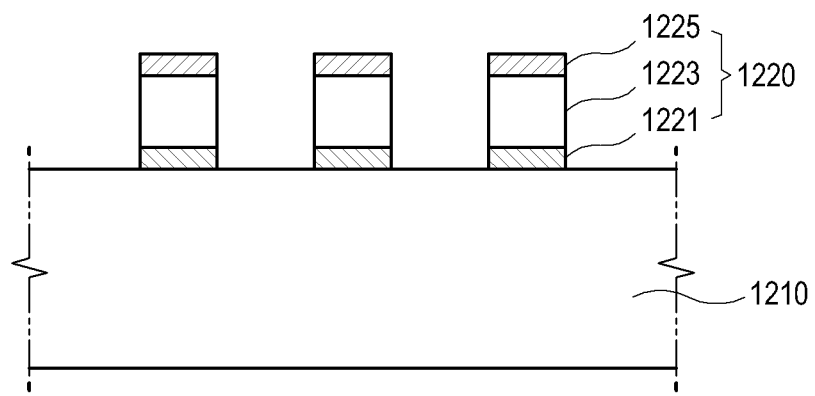
FIGS. 20-22 are lateral cross-section views illustrating exemplary stacking structures of a plurality of bars which form a linear grid applicable to the lower polarization layer of FIG. 19.
Figure 21:
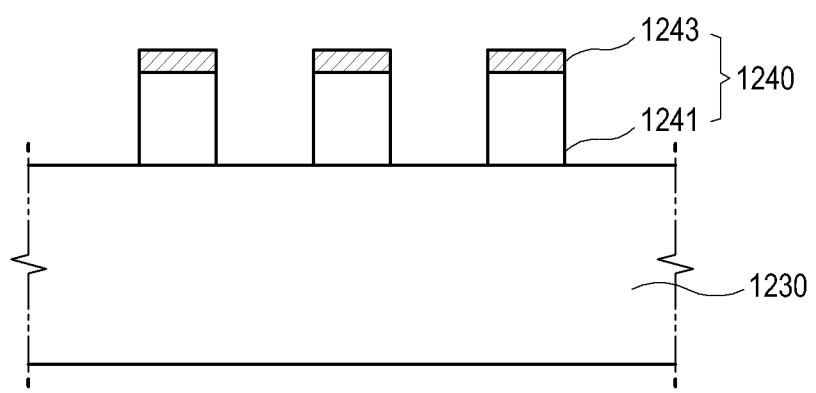
Figure 22:
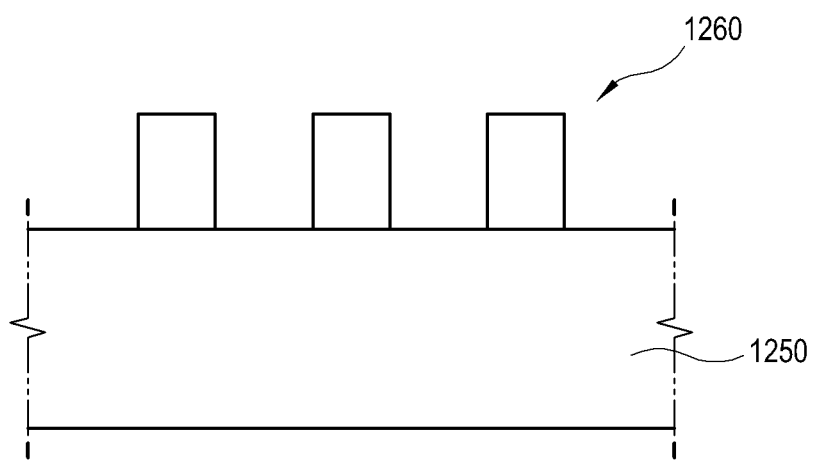

FIGS. 20-22 are lateral cross-section views illustrating exemplary stacking structures of a plurality of bars which form the linear grids.

As shown in FIG. 20, the linear grid forming the polarization layer includes a plurality of bars 1220. Each bar 1220 has a three-layered structure including a first dielectric layer 1221, a metal layer 1223, and a second dielectric layer 1225 which are stacked in sequence on a substrate 1210. Among other materials, the first dielectric layer 1221 may be made of silicon nitride SiNx, the metal layer 1223 may be made of a metal, and the second dielectric layer 1225 may be made of silicon dioxide SiO2. It should be appreciated, however, that various other materials may be applied to the respective layers.

The metal layer 1223 includes metal such as Au, Al, Cu, Ag or the like which is capable of reflecting light, and thus reflects the polarized component of the untransmitted light in the incident direction of the corresponding incident light. The second dielectric layer 1225 protects the metal layer 1223, and may also serve as a light absorbing layer to absorb external light.

As shown in FIG. 21, a plurality of bars 1240 may have a two-layered structure wherein a metal layer 1241 and a dielectric layer 1243 are sequentially stacked on a substrate 1230. Again, the metal layer 1241 serves to reflect the untransmitted polarized component of the light.

As shown in FIG. 22, a plurality of bars 1260 may have a single-layered structure wherein a metal layer 1260 is stacked on a substrate 1250.

Referring to FIGS. 20-22, the linear grid structure includes the reflection layer 1223, 1241, 1260 achieved by the metal layer for reflecting the light, and thus reflects the polarized component of the untransmitted light in the incident direction of the corresponding incident light.

As will be described in more detail below, the optical efficiency may be improved when the linear grid structure is applied to the lower polarization layer 1115 and the upper polarization layer 1116.

Figure 23:
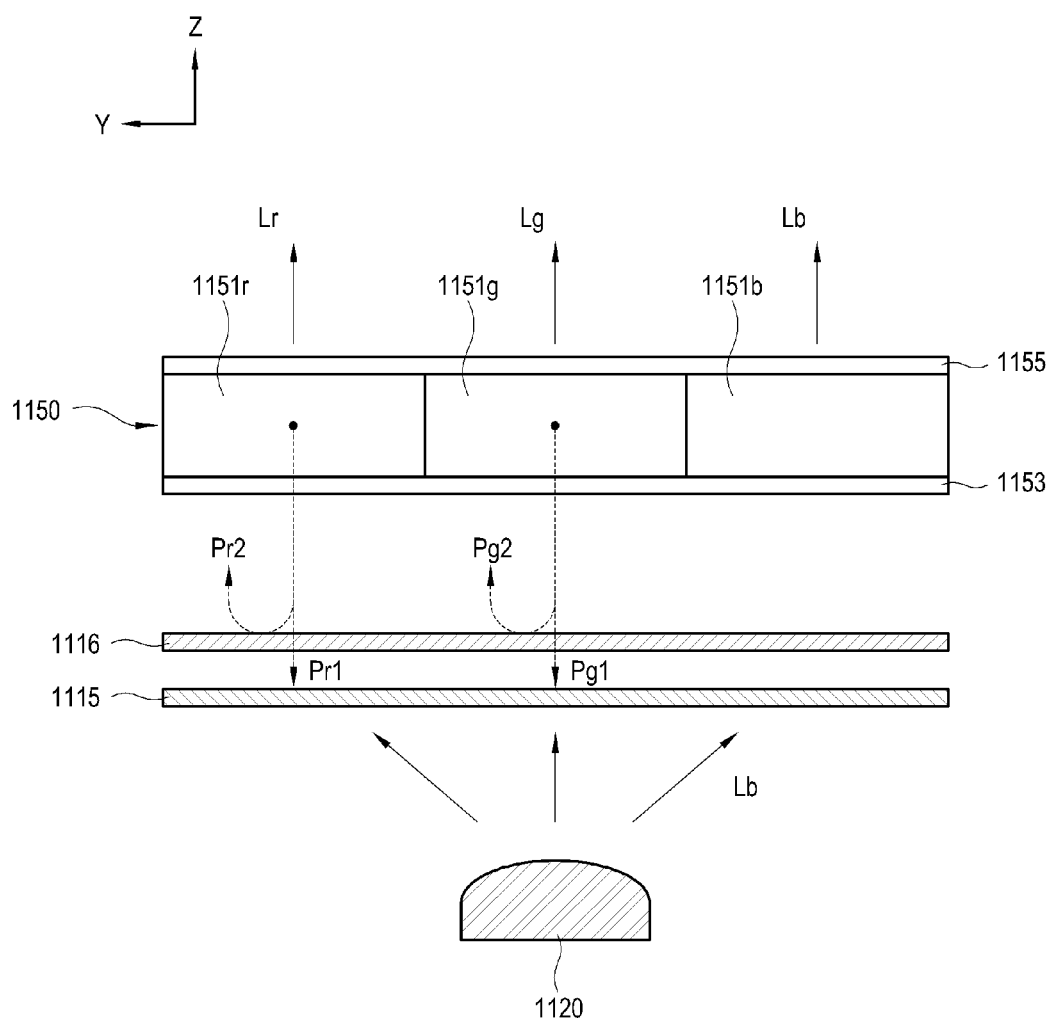
FIG. 23 is a schematic view illustrating a principle that a color filter filters the RGB colors out of blue light from a light source of the display apparatus of FIG. 18.

FIG. 23 schematically illustrates a principle that the color filter 1150 filters the RGB colors out of the blue light Lb from the light source 1120 of the display apparatus 1100 (see FIG. 18).

As shown in FIG. 23, the blue light Lb emitted from the light source 1120 is first filtered for polarization by the lower polarization layer 1115, and second filtered for polarization by the upper polarization layer 1116. The blue light Lb exiting the upper polarization layer 1116 then enters the color filter 1150.

The color filter 1150 includes an R-sub pixel layer 1151r, a G-sub pixel layer 1151g, and a B-sub pixel layer 1151b respectively corresponding to the RGB colors; a lower barrier layer 1153 covering the bottom surfaces of the sub pixel layers 1151*r*, 1151*g* and 1151*b*; and an upper barrier layer 1155 covering the top surfaces of the sub pixel layers 1151*r*, 1151*g* and 1151*b*.

The R-sub pixel layer 1151*r* and the G-sub pixel layer 1151*g* include quantum dots sized respectively corresponding to their colors. On the other hand, the B-sub pixel layer 1151*b* does not include quantum dots, and is made of a transparent material through which the blue light Lb from the light source 1120 is transmitted.

When the photons of the blue light Lb collide with the quantum dots of the R-sub pixel layer 1151*r* and the G-sub pixel layer 1151*g*, the red light Lr and the green light Lg are respectively emitted from their corresponding quantum dots. A portion of the red light Lr and the green light Lg emitted from the quantum dots travels in the Z direction, and another portion travels in the −Z direction.

The red light Lr traveling in the −Z direction includes the first polarized component Pr1 and the second polarized component Pr2 perpendicular to each other. When the red light Lr reaches the upper polarization layer 1116, the upper polarization layer 1116 reflects the second polarized component Pr2 in the Z direction. Thus, the second polarized component Pr2 is recycled.

Likewise, the green light Lg traveling in the −Z direction includes the first polarized component Pg1 and the second polarized component Pg2 perpendicular to each other. When the green light Lg reaches the upper polarization layer 1116, the upper polarization layer 1116 reflects the second polarized component Pg2 in the Z direction. Thus, the second polarized component Pg2 is recycled.

Accordingly, the upper polarization layer 1116 of the linear grid structure having reflective properties serves to reflect the second polarized components Pr2 and Pg2 of the red light Lr and the green light Lg in the Z direction. That is, the upper polarization layer 1116 functions similar to the lower barrier layer 653 (see FIG. 14) having the DBEF. As such, a DBEF may be omitted from the lower barrier layer 1153.

In addition, the lower polarization layer 1115 also has the linear grid structure and thus improves the optical efficiency even though a DBEF is not applied between the light guide plate 1130 (see FIG. 18) and the lower substrate 1111 (see FIG. 18).

In this exemplary embodiment, the linear grid structure is applied to both the lower polarization layer 1115 and the upper polarization layer 1116, but is not limited thereto. Alternatively, the linear grid may be applied only one of the lower polarization layer 1115 and the upper polarization layer 1116.

Figure 24:
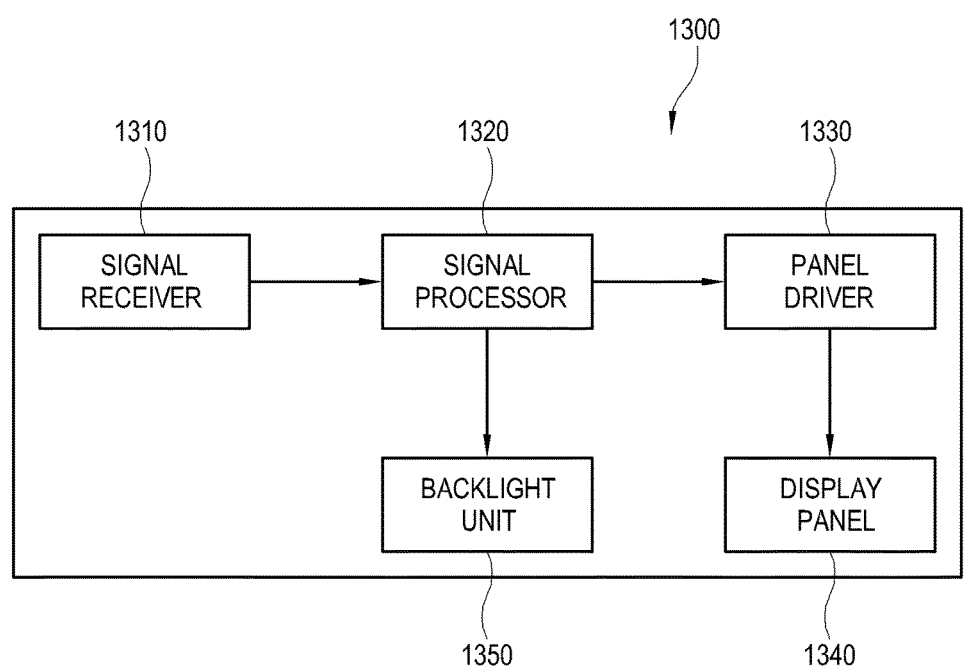
FIG. 24 is a block diagram of a display apparatus according to an exemplary embodiment.

FIG. 24 is a block diagram of a display apparatus 1300 according to an exemplary embodiment.

As shown in FIG. 24, the display apparatus 1300 includes a signal receiver 1310 for receiving an image signal/image data, a signal processor 1320 for processing the image signal received in the signal receiver 1310 in accordance with a preset image processing processes, a panel driver 1330 for outputting a driving signal corresponding to the image signal processed by the signal processor 1320, a display panel 1340 for displaying an image based on the image signal in response to the driving signal from the panel driver 1330, and a backlight unit 1350 for emitting light to the display panel 1340 in accordance with the image signal processed by the signal processor 1320.

In this embodiment, the display apparatus 1300 may comprise a television (TV), a monitor, a portable media player, a mobile phone, or any other device that can display an image.

The signal receiver 1310 receives an image signal/image data and transmits it to the signal processor 1320. The signal receiver 1310 may comprise any number of various devices in accordance with the standards of the image signal to be received and/or in accordance with the various types of display apparatuses that the display apparatus 1300 may comprise. For example, the signal receiver 1310 may receive a radio frequency (RF) signal transmitted from a transmitter of a broadcasting station, or may receive an image signal based on composite video, component video, super video, Syndicat des Constructeurs d'AppareilsRadiorécepteurs et Téléviseurs (SCART), high definition multimedia interface (HDMI), display port, unified display interface (UDI), wireless HD standards, or the like. If the image signal is a broadcasting signal, the signal receiver 1310 may include a tuner to be tuned to a channel corresponding to a broadcasting signal. Further, the signal receiver 1310 may receive an image data packet from a server through an electronic communications network, e.g., the internet.

The signal processor 1320 performs various image processing processes with regard to the image signal received by the signal receiver 1310. The signal processor 1320 outputs the processed image signal to the panel driver 1330 so that an image based on the corresponding image signal can be displayed on the display panel 1340.

There is no limit to the kind of image processing processes which may be performed by the signal processor 1320. For example, the image processing processes may include decoding which corresponds to an image format of the image data, de-interlacing of converting interlaced image data into progressive image data, scaling of adjusting the image data to have a preset resolution, noise reduction for improving image quality, detail enhancement, frame refresh rate conversion, or the like.

The signal processor 1320 may comprise a system-on-chip where various functions may be merged, or an image processing board on which individual elements capable of independently performing such processes are mounted to a printed circuit board and then provided within the display apparatus 1300.

The panel driver 1330, the display panel 1340, and the backlight unit 1350 are substantially the same as those of the foregoing exemplary embodiments, and thus repetitive descriptions thereof will be omitted for the sake of brevity.

Light emitted from a light source which exits a display panel of a display apparatus according to exemplary embodiments will be described in more detail below.

Figure 25:
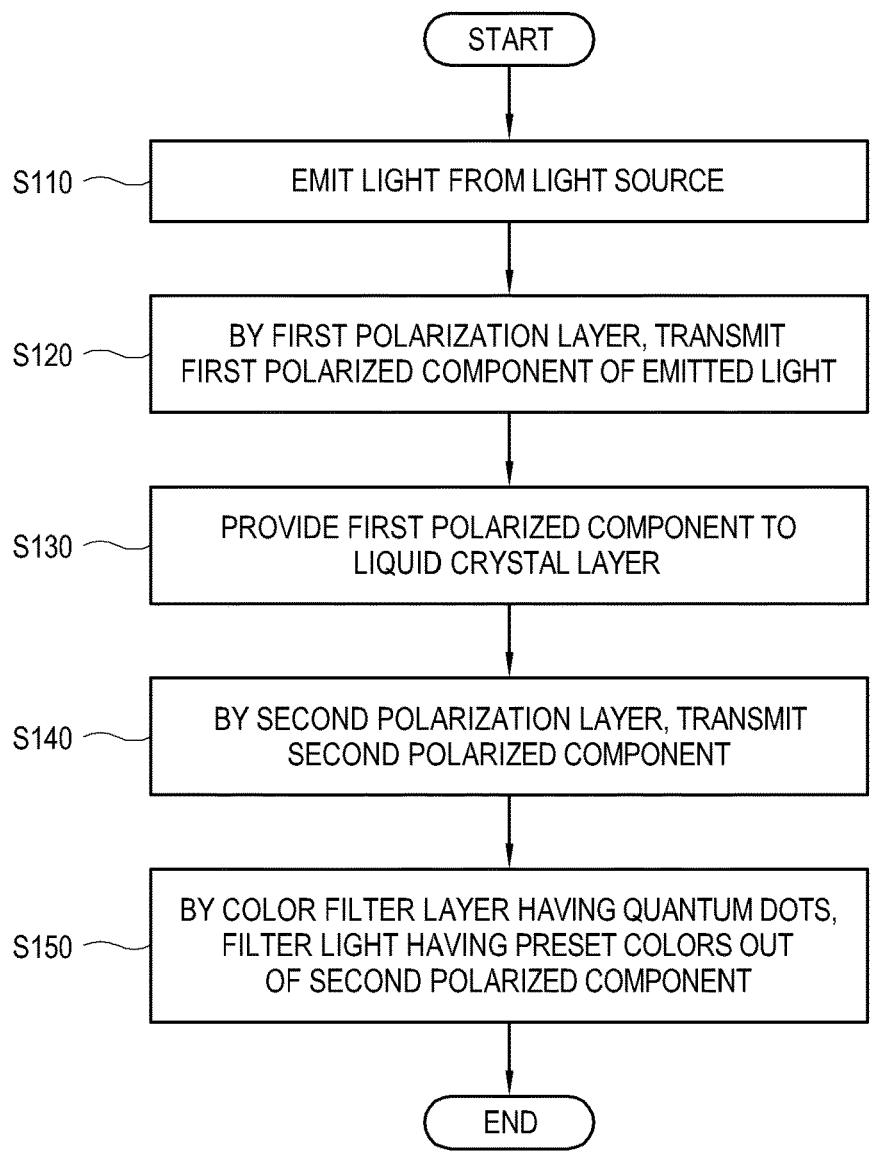
FIG. 25 is a flowchart showing a control method of a display apparatus according to an exemplary embodiment.

FIG. 25 is a flowchart showing a control method of a display apparatus according an exemplary embodiment.

As shown in FIG. 25, at step S110 the light source emits light. In this exemplary embodiment, the light source emits blue light.

At step S120, a first polarization layer transmits a first polarized component of the light emitted from the light source. In some exemplary embodiments, the light may be focused by a prism sheet before the light emitted from the light source reaches the first polarization layer.

At step S130, the first polarized component of the light is provided to the liquid crystal layer and transmitted therethrough.

At step S140, a second polarization layer transmits a second polarized component of the light emitted from the liquid crystal layer. The second polarized component is perpendicular to the first polarized component.

At step S150, the second polarized component exiting the second polarization layer is changed into light having a preset color via a color filter which includes quantum dots. The light of the preset colors may include red light and green light. On the other hand, the blue light directly exits through an area of the color filter which does not include quantum dots.

As a result of these steps, the blue light emitted from the light source is converted into the light having the RGB colors and then exits the display panel.

The display panel may be formed with the color filter being included therein, or the color filter may be formed separately and then included in the display panel. The display panel may be composed of the color filter and other configurations, such as the liquid crystal panel, the polarization layer, and so on.

The methods according to the foregoing exemplary embodiments may be achieved in the form of a program command that can be implemented by various computers, and recorded in a computer readable medium. Such a computer readable medium may include a program command, a data file, a data structure or the like, or any combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape, or the like. It will be appreciated that a memory, which can be included in a mobile terminal, is an example of the machine-readable storage medium suitable for storing a program having instructions for realizing the exemplary embodiments described herein. The program command recorded in this storage medium may be specially designed and configured according to the exemplary embodiments, or may be publicly known and available to those skilled in the art of computer software.

Although a few exemplary embodiments have been shown and described, it will be appreciated by those skilled in the art that changes may be made to these exemplary embodiments without departing from the principles and spirit of the present disclosure.

What is claimed is:

1. A display apparatus comprising:
a signal processor configured to process an image signal; and
a display configured to display an image based on the image signal processed by the signal processor, the display comprising:
a liquid crystal panel;
a light source configured to emit light toward the liquid crystal panel;
a first polarization layer disposed on a first surface of the liquid crystal panel and configured to transmit a first polarized component of the light emitted from the light source;
a second polarization layer disposed on a second surface of the liquid crystal panel opposed to the first surface and configured to transmit a second polarized component of light emitted from the liquid crystal panel;
a color filter disposed on a surface of the second polarization layer from which the second polarized component exits, the color filter comprising a quantum dot layer configured to filter light having preset colors out of the second polarized component exiting the second polarization layer;
a light compensation layer interposed in between the second polarization layer and the color filter, the light compensation layer configured to reflect a preset polarized component of light traveling from the color filter toward the second polarization layer toward the color filter; and
a diffusion layer formed on a surface of the light compensation layer and facing the second polarization layer,
wherein the diffusion layer diffuses light passed through the light compensation layer and traveling toward the second polarization layer.

2. The display apparatus according to claim 1, wherein the light compensation layer comprises a dual brightness enhancement film (DBEF).

3. The display apparatus according to claim 1, wherein the light compensation layer is configured to transmit the second polarized component exiting the second polarization layer and to reflect a polarized component different from the second polarized component.

4. The display apparatus according to claim 1, wherein the light source emits blue light, and
the quantum dot layer comprises:
a red filter area for filtering red light out of the blue light; and
a green filter area for filtering green light out of the blue light.

5. The display apparatus according to claim 4, wherein the color filter further comprises a light transmission area comprising a transparent material for transmitting the blue light, and
the red filter area, the green filter area, and the light transmission area are arranged corresponding to red, green, and blue sub pixels of the liquid crystal panel, respectively.

6. The display apparatus according to claim 4, wherein the second polarization layer comprises a linear grid, the linear grid comprising a plurality of bars defining a plurality of slits extending in a common direction, the linear grid configured to reflect the second polarized component of the light entering the second polarization layer.

7. The display apparatus according to claim 1, further comprising
a prism sheet arranged in between the light source and the first polarization layer, the prism sheet configured to focus the light emitted from the light source.

8. A display comprising:
a liquid crystal panel;
a light source configured to emit light toward the liquid crystal panel;
a first polarization layer disposed on a first surface of the liquid crystal panel and configured to transmit a first polarized component of the light emitted from the light source;
a second polarization layer disposed on a second surface of the liquid crystal panel opposed to the first surface and configured to transmit a second polarized component of light emitted from the liquid crystal panel; and
a color filter disposed on a surface of the second polarization layer from which the second polarized component exits, the color filter comprising a quantum dot layer configured to filter light having preset colors out of the second polarized component exiting the second polarization layer; and a light compensation layer interposed in between the second polarization layer and the color filter, the light compensation layer configured to reflect a preset polarized component of the light traveling, from the color filter toward the second polarization layer toward the color filter, wherein the light compensation layer comprises a dual brightness enhancement film (DBEF).

9. The display according to claim 8, further comprising a diffusion layer formed on a surface of the light compensation layer and facing the second polarization layer, and wherein the diffusion layer diffuses light passed through the light compensation layer and traveling toward the second polarization layer.

10. The display according to claim 8, wherein the light source emits blue light, and the quantum dot layer comprises:

a red filter area for filtering red light out of the blue light; and a green filter area for filtering green light out of the blue light.

11. The display according to claim 10, wherein the color filter comprises a light transmission area comprising a transparent material for transmitting the blue light, and the red filter area, the green filter area, and the light transmission area are arranged corresponding to red, green, and blue sub pixels of the liquid crystal panel, respectively.

12. A display apparatus comprising:

a signal processor configured to process an image signal; and a display configured to display an image based on the image signal processed by the signal processor, wherein the display comprises:

a liquid crystal panel, a light source configured to emit light toward the liquid crystal panel, a first polarization layer disposed on a first surface of the liquid crystal panel and configured to transmit a first polarized component of the light emitted from the light source, a second polarization layer disposed on a second surface of the liquid crystal panel opposed to the first surface and configured to transmit a second polarized component of light emitted from the liquid crystal panel, a color filter disposed on a surface of the second polarization layer from which the second polarized component exits, the color filter comprising a quantum dot layer configured to filter light having preset colors out of the second polarized component exiting the second polarization layer, and a light compensation layer interposed in between the second polarization layer and the color filter, the light compensation layer configured to reflect a preset polarized component of the light traveling from the color filter toward the second polarization layer toward the color filter, wherein the light compensation layer comprises a dual brightness enhancement film (DBEF).

* * * * *